United States Patent
Braho et al.

(10) Patent No.: US 8,255,219 B2
(45) Date of Patent: *Aug. 28, 2012

(54) METHOD AND APPARATUS FOR DETERMINING A CORRECTIVE ACTION FOR A SPEECH RECOGNITION SYSTEM BASED ON THE PERFORMANCE OF THE SYSTEM

(75) Inventors: Keith Braho, Murrysville, PA (US); Jeffrey Pike, Murrysville, PA (US); Amro El-Jaroudi, Pittsburgh, PA (US); Lori Pike, Murrysville, PA (US); Michael Laughery, Monroeville, PA (US)

(73) Assignee: Vocollect, Inc., Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/044,076

(22) Filed: Mar. 9, 2011

(65) Prior Publication Data
US 2011/0161083 A1 Jun. 30, 2011

Related U.S. Application Data

(60) Division of application No. 11/688,916, filed on Mar. 21, 2007, now Pat. No. 7,949,533, which is a continuation-in-part of application No. 11/539,456, filed on Oct. 6, 2006, now Pat. No. 7,827,032, which is a continuation-in-part of application No. 11/331,649, filed on Jan. 13, 2006, now abandoned, which is a continuation-in-part of application No. 11/051,825, filed on Feb. 4, 2005, now Pat. No. 7,865,362.

(60) Provisional application No. 60/788,622, filed on Apr. 3, 2006, provisional application No. 60/788,606, filed on Apr. 3, 2006, provisional application No. 60/788,621, filed on Apr. 3, 2006.

(51) Int. Cl.
*G10L 15/22* (2006.01)

(52) U.S. Cl. .................................................. 704/251
(58) Field of Classification Search .................. 704/251
See application file for complete search history.

(56) References Cited

U.S. PATENT DOCUMENTS
4,882,757 A 11/1989 Fisher et al.
(Continued)

FOREIGN PATENT DOCUMENTS
EP 0867857 A2 9/1998
(Continued)

OTHER PUBLICATIONS

Smith, Ronnie W., An Evaluation of Strategies for Selective Utterance Verification for Spoken Natural Language Dialog, Proc. Fifth Conference on Applied Natural Language Processing (ANLP), 1997, 41-48.

(Continued)

*Primary Examiner* — Susan McFadden
(74) *Attorney, Agent, or Firm* — Wood, Herron & Evans, LLP

(57) ABSTRACT

A method for assessing a performance of a speech recognition system may include determining a grade, corresponding to either recognition of instances of a word or recognition of instances of various words among a set of words, wherein the grade indicates a level of the performance of the system and the grade is based on a recognition rate and at least one recognition factor. An apparatus for assessing a performance of a speech recognition system may include a processor that determines a grade, corresponding to either recognition of instances of a word or recognition of instances of various words among a set of words, wherein the grade indicates a level of the performance of the system and wherein the grade is based on a recognition rate and at least one recognition factor.

42 Claims, 7 Drawing Sheets

U.S. PATENT DOCUMENTS

| | | | |
|---|---|---|---|
| 4,928,302 A | 5/1990 | Kaneuchi et al. | |
| 4,959,864 A | 9/1990 | Van Nes et al. | |
| 5,127,043 A | 6/1992 | Hunt et al. | |
| 5,127,055 A | 6/1992 | Larkey | |
| 5,230,023 A | 7/1993 | Nakano | |
| 5,297,194 A | 3/1994 | Hunt et al. | |
| 5,428,707 A | 6/1995 | Gould et al. | |
| 5,457,768 A | 10/1995 | Tsuboi et al. | |
| 5,465,317 A | 11/1995 | Epstein | |
| 5,488,652 A | 1/1996 | Bielby et al. | |
| 5,566,272 A | 10/1996 | Brems et al. | |
| 5,602,960 A | 2/1997 | Hon et al. | |
| 5,625,748 A | 4/1997 | McDonough et al. | |
| 5,640,485 A | 6/1997 | Ranta | |
| 5,644,680 A | 7/1997 | Bielby et al. | |
| 5,651,094 A | 7/1997 | Takagi et al. | |
| 5,684,925 A | 11/1997 | Morin et al. | |
| 5,710,864 A | 1/1998 | Juang et al. | |
| 5,717,826 A | 2/1998 | Setlur et al. | |
| 5,737,489 A | 4/1998 | Chou et al. | |
| 5,737,724 A | 4/1998 | Atal et al. | |
| 5,774,841 A | 6/1998 | Salazar et al. | |
| 5,774,858 A | 6/1998 | Taubkin et al. | |
| 5,797,123 A | 8/1998 | Chou et al. | |
| 5,799,273 A | 8/1998 | Mitchell et al. | |
| 5,832,430 A | 11/1998 | Lleida et al. | |
| 5,839,103 A | 11/1998 | Mammone et al. | |
| 5,842,163 A | 11/1998 | Weintraub | |
| 5,893,057 A | 4/1999 | Fujimoto et al. | |
| 5,893,902 A | 4/1999 | Transue et al. | |
| 5,895,447 A | 4/1999 | Ittycheriah et al. | |
| 5,899,972 A | 5/1999 | Miyazawa et al. | |
| 5,946,658 A | 8/1999 | Miyazawa et al. | |
| 5,960,447 A | 9/1999 | Holt et al. | |
| 6,003,002 A | 12/1999 | Netsch | |
| 6,006,183 A | 12/1999 | Lai et al. | |
| 6,073,096 A | 6/2000 | Gao et al. | |
| 6,076,057 A | 6/2000 | Narayanan et al. | |
| 6,088,669 A | 7/2000 | Maes | |
| 6,094,632 A | 7/2000 | Hattori | |
| 6,101,467 A | 8/2000 | Bartosik | |
| 6,122,612 A | 9/2000 | Goldberg | |
| 6,151,574 A | 11/2000 | Lee et al. | |
| 6,182,038 B1 | 1/2001 | Balakrishnan et al. | |
| 6,192,343 B1 | 2/2001 | Morgan et al. | |
| 6,205,426 B1 | 3/2001 | Nguyen et al. | |
| 6,230,129 B1 | 5/2001 | Morin et al. | |
| 6,233,555 B1 | 5/2001 | Parthasarathy et al. | |
| 6,233,559 B1 | 5/2001 | Balakrishnan | |
| 6,243,713 B1 | 6/2001 | Nelson et al. | |
| 6,246,980 B1 | 6/2001 | Glorion et al. | |
| 6,292,782 B1 | 9/2001 | Weideman | |
| 6,330,536 B1 | 12/2001 | Parthasarathy et al. | |
| 6,374,212 B2 | 4/2002 | Phillips et al. | |
| 6,374,221 B1 | 4/2002 | Haimi-Cohen | |
| 6,377,662 B1 | 4/2002 | Hunt et al. | |
| 6,377,949 B1 | 4/2002 | Gilmour | |
| 6,397,180 B1 | 5/2002 | Jaramillo et al. | |
| 6,421,640 B1 | 7/2002 | Dolfing et al. | |
| 6,438,519 B1 | 8/2002 | Campbell et al. | |
| 6,438,520 B1 | 8/2002 | Curt et al. | |
| 6,487,532 B1 | 11/2002 | Schoofs et al. | |
| 6,496,800 B1 | 12/2002 | Kong et al. | |
| 6,505,155 B1 | 1/2003 | Vanbuskirk et al. | |
| 6,507,816 B2 | 1/2003 | Ortega | |
| 6,526,380 B1 | 2/2003 | Thelen et al. | |
| 6,539,078 B1 | 3/2003 | Hunt et al. | |
| 6,542,866 B1 | 4/2003 | Jiang et al. | |
| 6,567,775 B1 | 5/2003 | Maali et al. | |
| 6,571,210 B2 | 5/2003 | Hon et al. | |
| 6,581,036 B1 | 6/2003 | Varney, Jr. | |
| 6,587,824 B1 | 7/2003 | Everhart et al. | |
| 6,594,629 B1 | 7/2003 | Basu et al. | |
| 6,598,017 B1 | 7/2003 | Yamamoto et al. | |
| 6,606,598 B1 | 8/2003 | Holthouse et al. | |
| 6,629,072 B1 | 9/2003 | Thelen et al. | |
| 6,675,142 B2 | 1/2004 | Ortega et al. | |
| 6,701,293 B2 | 3/2004 | Bennett et al. | |
| 6,732,074 B1 | 5/2004 | Kuroda | |
| 6,735,562 B1 | 5/2004 | Zhang et al. | |
| 6,754,627 B2 | 6/2004 | Woodward | |
| 6,766,295 B1 | 7/2004 | Murveit et al. | |
| 6,799,162 B1 | 9/2004 | Goronzy et al. | |
| 6,832,224 B2 | 12/2004 | Gilmour | |
| 6,834,265 B2 | 12/2004 | Balasuriya | |
| 6,839,667 B2 | 1/2005 | Reich | |
| 6,856,956 B2 | 2/2005 | Thrasher et al. | |
| 6,868,381 B1 | 3/2005 | Peters et al. | |
| 6,876,987 B2 | 4/2005 | Bahler et al. | |
| 6,879,956 B1 | 4/2005 | Honda et al. | |
| 6,882,972 B2 | 4/2005 | Kompe et al. | |
| 6,910,012 B2 | 6/2005 | Hartley et al. | |
| 6,917,918 B2 | 7/2005 | Rockenbeck et al. | |
| 6,922,466 B1 * | 7/2005 | Peterson et al. | 379/88.09 |
| 6,922,669 B2 | 7/2005 | Schalk et al. | |
| 6,941,264 B2 | 9/2005 | Konopka et al. | |
| 6,961,700 B2 | 11/2005 | Mitchell et al. | |
| 6,961,702 B2 | 11/2005 | Dobler et al. | |
| 6,985,859 B2 | 1/2006 | Morin | |
| 6,999,931 B2 * | 2/2006 | Zhou | 704/275 |
| 7,031,918 B2 | 4/2006 | Hwang | |
| 7,035,800 B2 | 4/2006 | Tapper | |
| 7,039,166 B1 | 5/2006 | Peterson et al. | |
| 7,050,550 B2 | 5/2006 | Steinbiss et al. | |
| 7,058,575 B2 | 6/2006 | Zhou | |
| 7,062,435 B2 | 6/2006 | Tzirkel-Hancock et al. | |
| 7,062,441 B1 | 6/2006 | Townshend | |
| 7,065,488 B2 | 6/2006 | Yajima et al. | |
| 7,069,513 B2 | 6/2006 | Damiba | |
| 7,072,750 B2 | 7/2006 | Pi et al. | |
| 7,072,836 B2 | 7/2006 | Shao | |
| 7,103,542 B2 | 9/2006 | Doyle | |
| 7,103,543 B2 | 9/2006 | Hernandez-Abrego et al. | |
| 7,203,644 B2 | 4/2007 | Anderson et al. | |
| 7,203,651 B2 | 4/2007 | Baruch et al. | |
| 7,216,148 B2 | 5/2007 | Matsunami et al. | |
| 7,225,127 B2 | 5/2007 | Lucke | |
| 7,266,494 B2 | 9/2007 | Droppo et al. | |
| 7,386,454 B2 | 6/2008 | Gopinath et al. | |
| 7,392,186 B2 | 6/2008 | Duan et al. | |
| 7,406,413 B2 | 7/2008 | Geppert et al. | |
| 7,454,340 B2 | 11/2008 | Sakai et al. | |
| 7,457,745 B2 | 11/2008 | Kadambe et al. | |
| 7,542,907 B2 | 6/2009 | Epstein et al. | |
| 7,565,282 B2 * | 7/2009 | Carus et al. | 704/9 |
| 7,684,984 B2 | 3/2010 | Kemp | |
| 7,827,032 B2 * | 11/2010 | Braho et al. | 704/251 |
| 7,865,362 B2 | 1/2011 | Braho et al. | |
| 7,895,039 B2 * | 2/2011 | Braho et al. | 704/251 |
| 7,949,533 B2 * | 5/2011 | Braho et al. | 704/270 |
| 7,983,912 B2 | 7/2011 | Hirakawa et al. | |
| 2002/0138274 A1 | 9/2002 | Sharma et al. | |
| 2002/0143540 A1 | 10/2002 | Malayath et al. | |
| 2002/0152071 A1 | 10/2002 | Chaiken et al. | |
| 2002/0178004 A1 | 11/2002 | Chang et al. | |
| 2002/0198712 A1 | 12/2002 | Hinde et al. | |
| 2003/0023438 A1 | 1/2003 | Schramm et al. | |
| 2003/0120486 A1 | 6/2003 | Brittan et al. | |
| 2003/0191639 A1 | 10/2003 | Mazza | |
| 2003/0220791 A1 | 11/2003 | Toyama | |
| 2004/0215457 A1 | 10/2004 | Meyer | |
| 2005/0055205 A1 | 3/2005 | Jersak et al. | |
| 2005/0071161 A1 | 3/2005 | Shen | |
| 2005/0080627 A1 | 4/2005 | Hennebert et al. | |
| 2011/0029312 A1 | 2/2011 | Braho et al. | |
| 2011/0029313 A1 | 2/2011 | Braho et al. | |
| 2011/0093269 A1 | 4/2011 | Braho et al. | |
| 2011/0161082 A1 | 6/2011 | Braho et al. | |
| 2011/0161083 A1 | 6/2011 | Braho et al. | |

FOREIGN PATENT DOCUMENTS

| | | |
|---|---|---|
| EP | 0905677 A1 | 3/1999 |
| EP | 1011094 A1 | 6/2000 |
| EP | 1377000 A1 | 1/2004 |
| WO | 0211121 A1 | 2/2002 |
| WO | 2005119193 A1 | 12/2005 |
| WO | 2006031752 A2 | 3/2006 |

OTHER PUBLICATIONS

Kellner, A., et al., Strategies for Name Recognition in Automatic Directory Assistance Systems, Interactive Voice Technology for Telecommunications Applications, IVTTA '98 Proceedings, 1998 IEEE 4th Workshop, Sep. 29, 1998.

Chengyi Zheng and Yonghong Yan, "Improving Speaker Adaptation by Adjusting the Adaptation Data Set"; 2000 IEEE International Symposium on Intelligent Signal Processing and Communication Systems. Nov. 5-8, 2000.

Christensen, "Speaker Adaptation of Hidden Markov Models using Maximum Likelihood Linear Regression", Thesis, Aalborg University, Apr. 1996.

Mokbel, "Online Adaptation of HMMs to Real-Life Conditions: A Unified Framework", IEEE Trans. on Speech and Audio Processing, May 2001.

International Search Report published Nov. 6, 2007 for WO2007/0118029.

Silke Goronzy, Krzysztof Marasek, Ralf Kompe, Semi-Supervised Speaker Adaptation, in Proceedings of the Sony Research Forum 2000, vol. 1, Tokyo, Japan, 2000.

* cited by examiner

METHOD AND APPARATUS FOR DETERMINING A CORRECTIVE ACTION FOR A SPEECH RECOGNITION SYSTEM BASED ON THE PERFORMANCE OF THE SYSTEM

RELATED APPLICATIONS

This Application is a Divisional Application of U.S. patent application Ser. No. 11/688,916, entitled "Methods and Systems for Assessing and Improving the Performance of a Speech Recognition System", filed Mar. 21, 2007, which application is a continuation-in-part of U.S. patent application Ser. No. 11/539,456, entitled "Method and Systems for Adapting a Model for a Speech Recognition System" filed Oct. 6, 2006, which is a continuation-in-part application of U.S. patent application Ser. No. 11/331,649, entitled "Method and System for Considering Information About an Expected Response When Performing Speech Recognition" filed Jan. 13, 2006, which is a continuation-in-part application of U.S. patent application Ser. No. 11/051,825, entitled "Method and System for Considering Information About an Expected Response When Performing Speech Recognition" filed Feb. 4, 2005, which all applications are incorporated herein by reference in entirety. This application also claims the benefit of U.S. Provisional Application No. 60/788,622, entitled "Methods and Systems for Assessing the Performance of a Speech Recognition System", filed Apr. 3, 2006, U.S. Provisional Application No. 60/788,606, entitled "Methods and Systems for Adapting a Model for a Speech Recognition System", filed Apr. 3, 2006, and U.S. Provisional Application No. 60/788,621, entitled "Methods and Systems for Optimizing Model Adaptation for a Speech Recognition System", filed Apr. 3, 2006, which all applications are incorporated herein by reference in entirety.

TECHNICAL FIELD

The invention relates to speech recognition and more particularly to assessing and improving the performance of a speech recognition system.

BACKGROUND

One illustrative application of speech recognition technology applies to the workplace. Speech recognition systems have simplified many tasks particularly for a user in the workplace by permitting the user to perform hands-free communication with a computer as a convenient alternative to communication via conventional peripheral input/output devices. For example, a warehouse or inventory worker user could wear a wireless wearable terminal having a speech recognition system that permits communication between the user and a central computer system so that the user can receive work assignments and instructions from the central computer system. The user could also communicate to the central computer system information such as data entries, questions, work progress reports and work condition reports. In a warehouse or inventory environment, a user can be directed (through an instruction from the central computer system or visually by means of a display) to a particular work area that is labeled with a multiple-digit number (check-digit) such as "1-2-3" and asked to speak the check-digit. The user would then respond with the expected response "1-2-3". (Note that a "check-digit" can be any word or sequence of words, and is not limited to digits.)

Other such examples of communication between a user and speech recognition system are described in U.S. Patent Application No. 2003/0154075 and include environments where a wearable or portable terminal is not required such as in an automobile or a telephone system; environments that are not in a warehouse such as in a managed care home, nursing home, pharmacy, retail store, and office; voice-controlled information processing systems that process, for example, credit card numbers, bank account numbers, social security numbers and personal identification numbers; other applications such as command and control, dictation, data entry and information retrieval applications; and speech recognition system features such as user verification, password verification, quantity verification, and repeat/acknowledge messages. The inventions presented here can be used in those applications. In using a speech recognition system, manual data entry is eliminated or at the least reduced, and users can perform their tasks faster, more accurately and more productively.

Example Speech Recognition Errors

Errors can be made by a speech recognition system however, due to for example background noise or a user's unfamiliarity or misuse of the system. The errors made by a system can be classified into various types. A metric, an error rate (which can be defined as the percentage or ratio of observations with speech recognition errors over the number of observations of the system and which can be determined over a window of time and/or data and per user) is often used to evaluate the number and types of errors made by a speech recognition system and is thus useful in evaluating the performance of the system. An observation can be defined as any speech unit by which speech recognition may be measured. An observation may be a syllable, a phoneme, a single word or multiple words (such as in a phrase, utterance or sentence). When counting the number of observations of the system, the observations input to the system may be counted or the observations output by the system may be counted. One skilled in the art will also know and understand that an accuracy rate (which can be defined as the percentage or ratio of correct observations of the system over the number of observations of the system and which can be determined over a window of time and/or date and per user) can be used to evaluate the performance of the system. Recognition rates can be defined in a variety of other ways, such as a count of observations with errors divided by a length of time, a count of correct observations divided by a period of time, a count of observations with errors divided by a number of transactions, a count of correct observations divided by a number of transactions, a count of observations with errors after an event has occurred (such as apparatus being powered on or a user starting a task), or a count of correct observations after an event has occurred, to name a few. Therefore, a recognition rate (which can be an error rate, an accuracy rate, a rate based upon the identification or counting of observations with errors or correct observations, or other type of recognition rate known to those skilled in the art) is useful in evaluating the performance of the system. In general, a recognition rate can be determined for a word or for various words among a set of words, or for a user or multiple users. Identification of a system's errors can be done by comparing a reference transcription of a user's input speech to the hypothesis generated by the system (the system's interpretation of the user's input speech). Furthermore, as known to those skilled in the art, the comparison can be time-aligned or text-aligned.

One type of speech recognition error is a substitution, in which the speech recognition system's hypothesis replaces a word that is in the reference transcription with an incorrect word. For example, if system recognizes "1-5-3" in response to the user's input speech "1-2-3", the system made one substitution: substituting the '5' for the '2'.

Another type of speech recognition error is a deletion, in which the speech recognition system's hypothesis lacks a word that is in the reference transcription. For example, if system recognizes "1-3" in response to the user's input speech "1-2-3", the system deleted one word, the '2'. One variation of the deletion error is a deletion due to recognizing garbage, in which the system erroneously recognizes a garbage model instead of recognizing an actual word. Another variation of the deletion error is a deletion due to a speech misdetection, where the system fails to detect that the audio input to the system contains speech and as a result does not submit features of the audio input to the system's search algorithm. Another type of deletion occurs when the system rejects a correct observation due to a low confidence score. Yet another variation of the deletion error is a deletion due to a rejected substitution, where a search algorithm of the speech recognition generates a substitution, which is later rejected by an acceptance algorithm of the system. Still another type of deletion, occurring in time-aligned comparisons, is a merge: the speech recognition system recognizes two spoken words as one. For example, the user says "four-two" and the system outputs "forty".

In this application, a garbage model refers to the general class of models for sounds that do not convey information. Examples may include for example models of breath noises, "um", "uh", sniffles, wind noise, the sound of a pallet dropping, the sound of a car door slamming, or other general model such as a wildcard that is intended to match the input audio for any audio that doesn't match a model in the library of models.

Yet another type of speech recognition error is an insertion, in which the speech recognition system's hypothesis includes a word (or symbol) that does not correspond to any word in the reference transcription. Insertion errors often occur when the system generates two symbols that correspond to one symbol. One of these symbols may correspond to the reference transcription and be tagged as a correct observation. If it does not correspond to the reference transcription, it can be tagged as a substitution error. In either case, the other symbol can be tagged as an insertion error. Insertion errors are also common when noise is mistakenly recognized as speech.

In contrast to determining that an actual error or correct observation occurred by comparing a system's hypothesis to a reference transcript, an error or correct observation can be estimated or deemed to have occurred based on system behavior and user behavior. This application describes methods for determining a recognition rate, wherein the recognition rate is an estimate based on estimated errors or estimated correct observations deemed to have occurred after evaluating system and user behavior. Accordingly, one can estimate or evaluate the performance level of the speech recognition system by detecting in this manner the various errors committed by or correct observations of the system. One way to detect a speech recognition error is based on feedback a user provides to the speech recognition system. Feedback can be requested by the speech recognition system. For example, the system could ask the user to confirm the system's hypothesis by asking the user for example "Did you say 1-5-3?", and if the user responds "no", it indicates that the system made an error recognizing "1-5-3". Another type of feedback is based on a user's emotion detected by speech recognition. For example, if the system recognizes in the user's input speech that the user is sighing or saying words indicating aggravation, it may indicate that an error occurred. Yet another type of feedback is based on a user's correction command to the system, such as the user speaking "back-up" or "erase", or the user identifying what word was spoken (which could be from a list of possible words displayed by the system). When a correction is commanded to the system, it may be that an error occurred.

Assessing the Performance of a Speech Recognition System

Errors made by a speech recognition system for a particular user or multiple users in the same environment occur due to various reasons. Environmental factors such as background noise influence the performance of a speech recognition system. Furthermore, a particular user may report a system's poor recognition accuracy when other users in the same environment do not report similar problems, for various reasons. One reason may be that the models used by the speech recognition system are not well-matched to the user's speech patterns. Another possible reason may be that the user's expectations of the system are higher than other users and are unrealistic. Another possible reason is that the user is being uncooperative or is tired of working and blames the system for the user's poor performance in order to get a "troubleshooting break".

One common way to assess the situation is for the supervisor to listen in to the worker while he performs his job. However, this is a time consuming process and because a user may alter his or her behavior and speech patterns when being observed, this method often does not yield satisfactory results. Furthermore, this method requires the supervisor to have the expertise of knowing how to assess a system and user's performance, knowing what is acceptable performance and knowing how to improve the performance. There are other methods for assessing performance, but these methods require taking a transcript of the user's speech and the output of the speech recognition system and performing an analysis.

Therefore, it is useful to provide a way for a supervisor to assess performance of a speech recognition system when the system is used by a particular user or set of users, determining if a problem exists and if so, how to correct it. Furthermore, it is useful to discriminate between actual speech recognition problems (due to for example environmental influences or a user not knowing how to effectively use the system) and user misbehavior. In addition, it is useful to assess the performance of a system and provide a report of this assessment without creating or manually correcting a transcription of the audio processed by the speech recognition system. It is also useful to communicate the report for example to the user on the portable terminal or to another person (such as a supervisor or a professional services support person) on a management console such as one at a central computer system. Further, it is useful to identify to the user or other person (such a supervisor or professional services support person) when a system is having recognition problems and accordingly instruct the user to take corrective action to fix the recognition problems. Several such systems and methods are disclosed in example embodiments disclosed herein.

Model Adaptation for a Speech Recognition System

The information provided by a performance assessment does not only provide helpful information to a user or a supervisor; a performance assessment can be used to improve the adaptation of a speech recognition system. A speech recognition system can improve its performance over time, as more speech samples are processed by a system, by improving its acoustic models through training or other learning or adaptation algorithms. At the same time, it is useful to prevent the system from adapting in an undesirable way, thereby resulting in a system that performs worse than it did prior to adaptation or a system that degrades over time. Adapting models can use significant computational, storage, and/or power resources to create the adapted models and radio transmission energy to transmit the new models to a server. Example embodiments of the invention disclosed herein can control the adaptation of a speech recognition system to avoid inefficient use of resources and to avoid adapting away from well-performing models, by controlling or adjusting adaptation based on a performance assessment of the system.

BRIEF DESCRIPTION OF THE DRAWINGS

The accompanying drawings, which are incorporated in and constitute a part of this specification, illustrate speech recognition system components and embodiments of the invention and, together with the detailed description of the embodiments given below, serve to explain the principles of the invention.

DETAILED DESCRIPTION OF EXAMPLE EMBODIMENTS OF THE INVENTION

Example Embodiments of a Speech Recognition System and a Management Console

Figure 1:
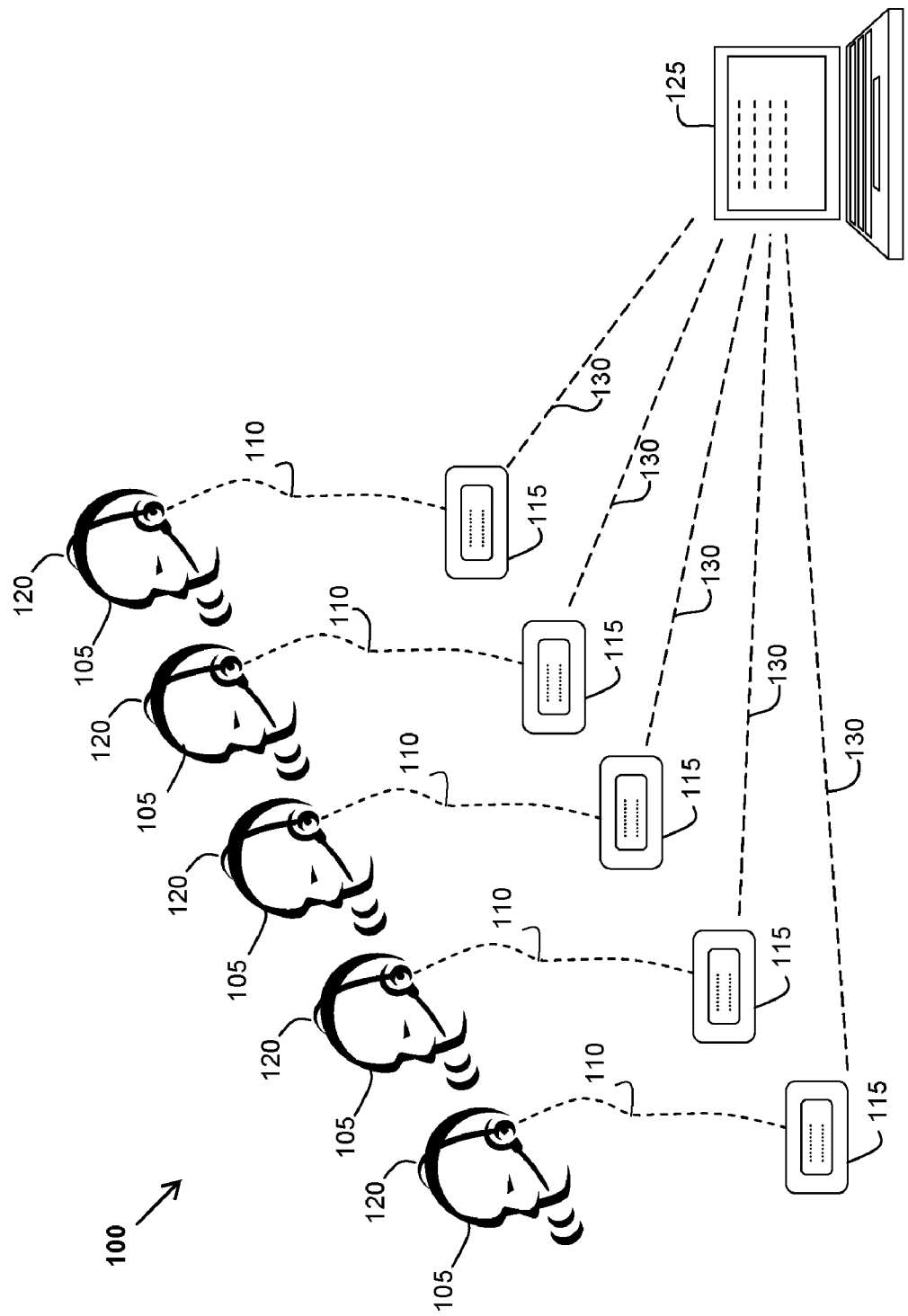
FIG. 1 illustrates a illustrates a view of multiple portable terminals, each used by a user and each being monitored by a management console, according to an example embodiment of the invention.

FIG. 1 illustrates an example embodiment of the invention, for an inventory or warehouse environment, including multiple portable terminals 115 (each having processing circuitry and/or software to implement one or more speech recognition methods disclosed herein) used by users 105 having headsets 120. (In another example embodiment, the speech recognition system is located in headset 120, eliminating the need for terminal 115.) A user can speak in a spoken language, through a microphone in the headset 120 and the audio information is converted by the terminal 115 to a useable digital format to be transferred back to a management console 125. Terminal 115, using an RF communication card, can communicate with console 125, through a wireless connection 130, employing for example an IEEE 802.11 standard. Console 125 has a display for monitoring the speech recognition systems of the portable terminals 115 by someone such as a supervisor or a professional services support person. U.S. patent application Ser. No. 10/671,142, entitled "Apparatus and Method for Detecting User Speech", incorporated herein by reference, provides further details for implementing such a system.

FIG. 1 illustrates the benefits of communicating one or more performance assessments of use of speech recognition system(s) by individual or multiple people. In an example embodiment, terminals 115 include a display so that a user in the workplace can view an individual performance assessment and if the assessment is poor (based on a predetermined standard), view instructions for taking corrective action. In another example embodiment, terminals 115 (with or without a display) produce audio responses to the user to report the performance assessment and instructions for possible corrective action or actions. In another example embodiment, console 125 networked to terminals 115 provides a location to view performance assessment(s) of one or more speech recognition systems and user's use of the systems in the workplace. Yet in another example embodiment, terminals 115 are connected to a larger network (such as an intranet) that includes PCs with web browsers, so that performances assessments (of use of system by individual or multiple users) can be viewed at any PC or any terminal 115 connected to the network. Performance assessments can be aggregated, consolidated or otherwise organized on console 125, at a location other than where the speech recognition systems and users are located, so that another person (such as a supervisor or professional services support person) can evaluate the performance of speech recognition systems and the users using the systems as whole. In addition, multiple performance assessments displayed on console 125 allow a supervisor to compare a particular speech recognition system and user's use of the system against other systems and users using the other systems. Applications for example embodiments of the invention are not strictly limited to the warehouse environment and portable terminals 115 shown in FIG. 1. Other applications and environments in which example embodiments may be implemented are described in the BACKGROUND section of this application.

Example Embodiments of Assessing and Improving the Performance of a Speech Recognition System The invention presents several approaches for assessing and improving the performance of a speech recognition system as described herein. Note that in this description, references to "one embodiment" or "an embodiment" mean that the feature being referred to is included in at least one embodiment of the invention. Furthermore, separate references to "one embodiment" in this description do not necessarily refer to the same embodiment; however, neither are such embodiments mutually exclusive, unless so stated and except as will be readily apparent to those skilled in the art. Thus, the invention can include any variety of combinations and/or integrations of the embodiments described herein.

In one approach, a method for assessing a performance of a speech recognition system includes determining a grade, corresponding to either recognition of instances of a word or recognition of instances of various words among a set of words, wherein the grade indicates a level of the performance of the system and the grade is based on a recognition rate and at least one recognition factor. The approach may be implemented as an apparatus, including a processor adapted to determine a grade, corresponding to either recognition of instances of a word or recognition of instances of various words among a set of words, wherein the grade indicates a level of the performance of the system and the grade is based on a recognition rate and at least one recognition factor.

Yet in another approach, a method for model adaptation for a speech recognition system may include determining a performance assessment of the system, corresponding to either recognition of instances of word or recognition of instances of various words among a set of words. The method may further include adjusting an adaptation, of a model for the word or various models for the various words, based on the performance assessment. The approach may be implemented as an apparatus, which may include all or a subset of the following: a processor adapted to determine a performance assessment of the system, corresponding to either recognition of instances of word or recognition of instances of various words among a set of words. The apparatus may further include a controller adapted to adjust an adaptation of the model for the word or various models for the various words, based on the performance assessment.

In another approach, a method for improving performance of a speech recognition system includes determining a performance of the system, corresponding to either recognition of instances of a word or recognition of instances of various words among a set of words, and determining a corrective action based on the performance, to improve the performance. The method may further include communicating the corrective action to the user or performing the corrective action. The approach may be implemented as an apparatus, including a processor adapted to determine a performance of the system, corresponding to either recognition of instances of a word or recognition of instances of various words among a set of words, and adapted to determine a corrective action based on the performance, to improve the performance. The processor may further be adapted to communicate the corrective action to the user or to perform the corrective action.

In yet another approach, a method for assessing a performance of a speech recognition system includes determining a grade, corresponding to either recognition of instances of a word or recognition of instances of various words among a set of words, and the grade indicates a level of the performance of the system and the grade is based on a count of observations with errors or a count of correct observations and at least one recognition factor. The approach may be implemented as an apparatus, including a processor that determines a grade, corresponding to either recognition of instances of a word or recognition of instances of various words among a set of words, and the grade indicates a level of the performance of the system and the grade is based on a count of observations with errors or a count of correct observations and at least one recognition factor.

Example Embodiments of a Speech Recognition System

Figure 2:
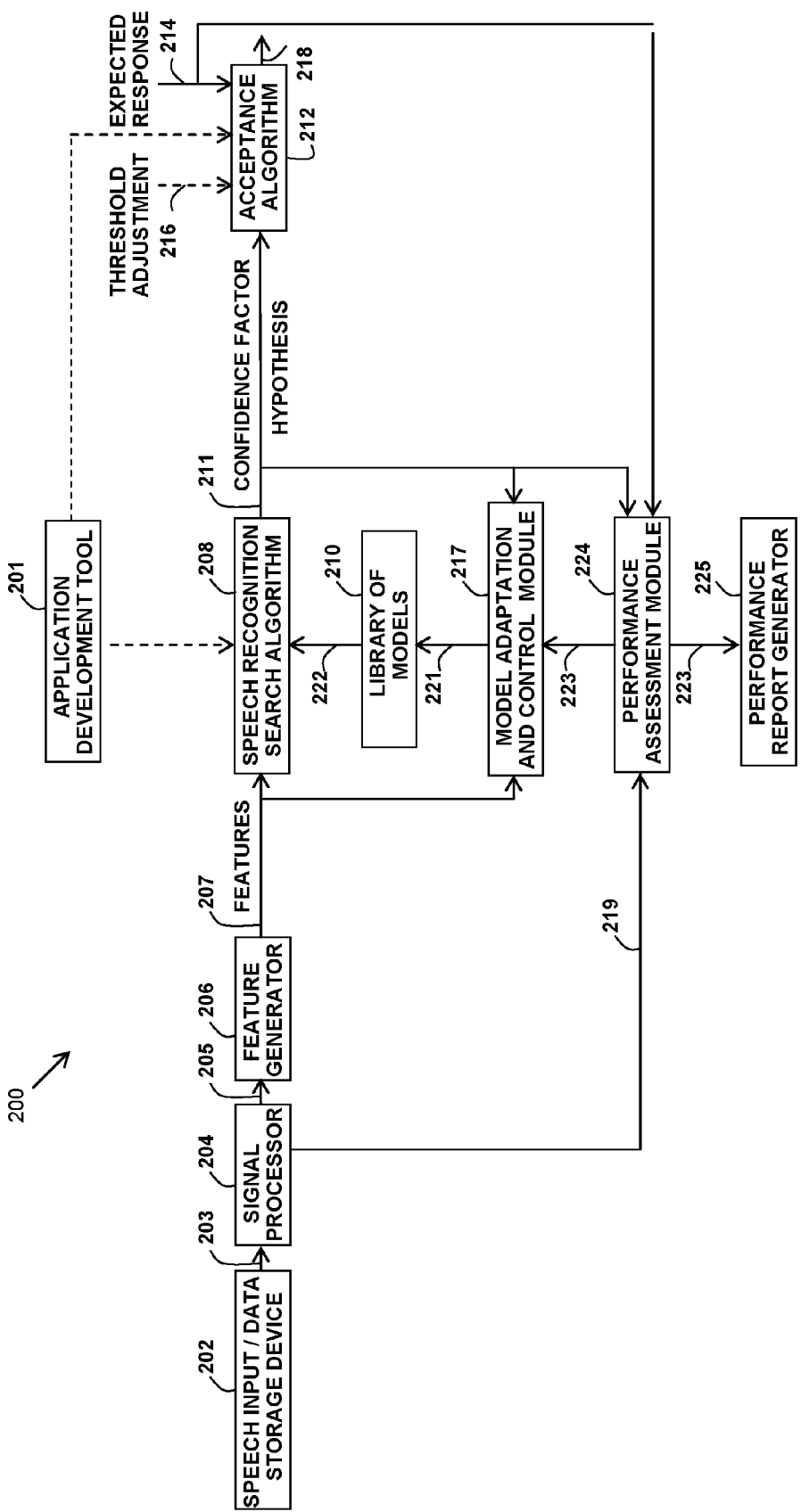
FIG. 2 illustrates a schematic view of a speech recognition system, according to an example embodiment of the invention.

FIG. 2 illustrates a schematic view of a speech recognition system, according to an example embodiment of the invention. One of ordinary skill in the art will recognize that the various functional blocks of the speech recognition system, including the inventive features, can be implemented using a variety of technologies and through various hardware and software configurations. As such, the blocks shown in FIG. 2 are not meant to indicate separate circuits or to be otherwise limiting, but rather show the functional features and components of the system.

Referring to FIG. 2 in system 200, a speech signal, such as from a system user or from a data storage device, may be captured by a speech input device 202 in a variety of conventional ways. Typically, a microphone or other electro-acoustical device senses speech input from a user and converts it into an analog voltage signal 203 that then is forwarded to a signal processor 204. Signal processor 204 converts the analog speech input 203 into a digitized stream of data 205 that can be separated into separate units for analysis. Alternatively, this audio data from device 202 can be retrieved from a data storage device. Signal processor 204 also generates a speech-to-noise ratio value. In particular, the signal processor 204 divides the digital stream of data that is created into a sequence of time-slices, or frames 205, each of which is then processed by a feature generator 206, thereby producing features (vector, matrix, or otherwise organized set of numbers representing the acoustic features of the frames) 207. In an example embodiment, Linear Predictive Coding (LPC) coefficients are used to represent speech (as discussed in U.S. Pat. No. 4,882,757, entitled "Speech Recognition System", incorporated herein by reference). However, other functionally equivalent methods are contemplated within the scope of the invention as well.

A speech recognition search algorithm function 208, realized by an appropriate circuit and/or software in the system 200 analyzes the features 207, using probabilistic models provided through 222 from a library of suitable models 210, in an attempt to determine what hypothesis to assign to the speech input captured by input device 202.

When in operation, the search algorithm 208 compares the features 207 generated in the generator 206 with reference representations of speech, or speech models, in library 210 in order to determine the word or words that best match the speech input from device 202. Part of this recognition process is to assign a confidence factor for the speech to indicate how closely the sequence of features 207 used in the search algorithm 208 matches the closest or best-matching models in library 210. As such, a hypothesis consisting of one or more vocabulary items and associated confidence factors 211 is directed to an acceptance algorithm 212. If the confidence factor is above a predetermined acceptance threshold, then the acceptance algorithm 212 makes a decision 218 to accept the hypothesis as recognized speech. If however, the confidence factor is not above the acceptance threshold, algorithm 212 makes a decision 218 to ignore or reject the recognized speech or prompts the user to repeat the speech to input device 202.

Example Embodiments of a Performance Assessment Module

Performance assessment module 224 (which may be implemented in a processor) determines or estimates a performance assessment. The performance assessment may be a recognition rate, a grade, or any other type of performance assessment of the speech recognition system.

A recognition rate may be an error rate, which can be defined as the percentage or ratio of observations with speech recognition errors over the number of observations of the system and the error rate can be determined over a window of time (e.g. predetermined length of time) and/or data (e.g. predetermined number of utterances input to the system). An observation can be defined as any speech unit by which speech recognition may be measured. An observation may be a syllable, a phoneme, a single word or multiple words (such as in a phrase, utterance or sentence). When counting the number of observations of the system, the observations input to the system may be counted or the observations output by the system may be counted. For example, the recognition rate can be a word error rate, the percentage or ratio of speech recognition errors over the number of words input into the system. The recognition rate may also be an accuracy rate, which can be defined as the percentage or ratio of correct observations by the system over the number of observations of the system, and the accuracy rate can be determined over a window of time (e.g. predetermined length of time) and/or data (e.g. predetermined number of utterances input to the system). (An utterance is a spoken phrase of at least one word such as '1' or "1-2-3".). The recognition rate may be a count of observations with errors divided by a length of time, a count of correct observations divided by a length of time, a count of observations with errors divided by a number of transactions, a count of correct observations divided by a number of transactions, a count of observations with errors after an event has occurred (such as apparatus being powered on or a user starting a task), or a count of correct observations after an event has occurred. Therefore, a recognition rate can be an error rate, an accuracy rate, a rate based upon the identification or counting of observations with errors or correct observations, or other type of recognition rate known to those skilled in the art. Furthermore, the recognition rate can be determined or estimated in the following ways: per user; over a number of users; per word; over for a set of words; or per a group of consecutively spoken words, such as an utterance, phrase or sentence. Furthermore, recognition rate determined by module 224 can be based on actual errors, correct observations and observations as determined from comparing the system's hypothesis to the reference transcript or based on estimates of these deemed to have occurred after evaluating system and user behavior, as discussed later in this application. Therefore, the recognition rate determination can be a recognition rate estimation. Inputs to module 224 needed to calculate a recognition rate are those needed for a recognition rate calculation used for a particular application. In an example embodiment, inputs include a hypothesis and confidence factor 211 with its associated timing information and expected response 214. (U.S. patent application Ser. No. 11/051,825, and the BACKGROUND section of this present application describes scenarios in which an expected response from a user is processed by a speech recognition system.)

The performance assessment by the performance assessment module 224 may also be a grade, which can be defined as an assessment of the performance of the speech recognition system when used by a particular user. Inputs to module 224 needed to determine or estimate the grade depend on the particular application in which the system is being used. In an example embodiment, inputs include a speech-to-noise ratio 219 and the number of words in an utterance input to the speech recognition system.

Example Embodiments of a Performance Report Generator

Performance assessment module 224 outputs performance assessments 223 to performance report generator 225. Performance report generator 225 outputs a report of the performance assessment and suggestions to a user for improving the performance of the speech recognition system.

Example Embodiments of a Model Adaptation and Control Module

In an example embodiment, performance assessment module 224 also outputs performance assessments 223 to model adaptation and control module 217. Model adaptation and control module 217 (which may be implemented as a hardware or software controller or control mechanism) controls or adjusts the adaptation of models. Inputs to module 217 are those need to for the particular control of model adaptation desired for a particular application. In an example embodiment, inputs are a hypothesis 211 and features 207. Module 217 determines when to adapt a certain model or models (including when to adapt or withhold adaptation) and which utterances to use to adapt the models. Furthermore, module 217 adapts models by using the transcription (generated by the speech recognition system) of the utterance and the features 207 observed by the recognition system corresponding to the utterance. In controlling or adjusting adaptation, module 217, determines the criteria to be met before adaptation is ordered. Furthermore, once adaptation is to proceed, module 217 may determine whether the existing models are replaced with new models created with the new features only or whether the existing models are just adapted using information from both the new features and the existing features of the existing models. Module 217 outputs adapted models 221 to the library 210 of models.

In an example embodiment, model adaptation and control module 217 uses the performance assessments 223 from performance assessment module 224 to control model adaptation of models. By controlling adaptation, the speech recognition system prevents adaptation from causing recognition accuracy to get worse when it's at an acceptable level and avoids inefficient use of computational, storage and/or power resources.

FIGS. 3, 6-10 are flow charts illustrating methods according to example embodiments of the invention. The techniques illustrated in these flow charts may be performed sequentially, in parallel or in an order other than that which is described. It should be appreciated that not all of the techniques described are required to be performed, that additional techniques may be added, and that some of the illustrated techniques may be substituted with other techniques.

Example Embodiments of Performance Assessment and Report Generation

Figure 3:
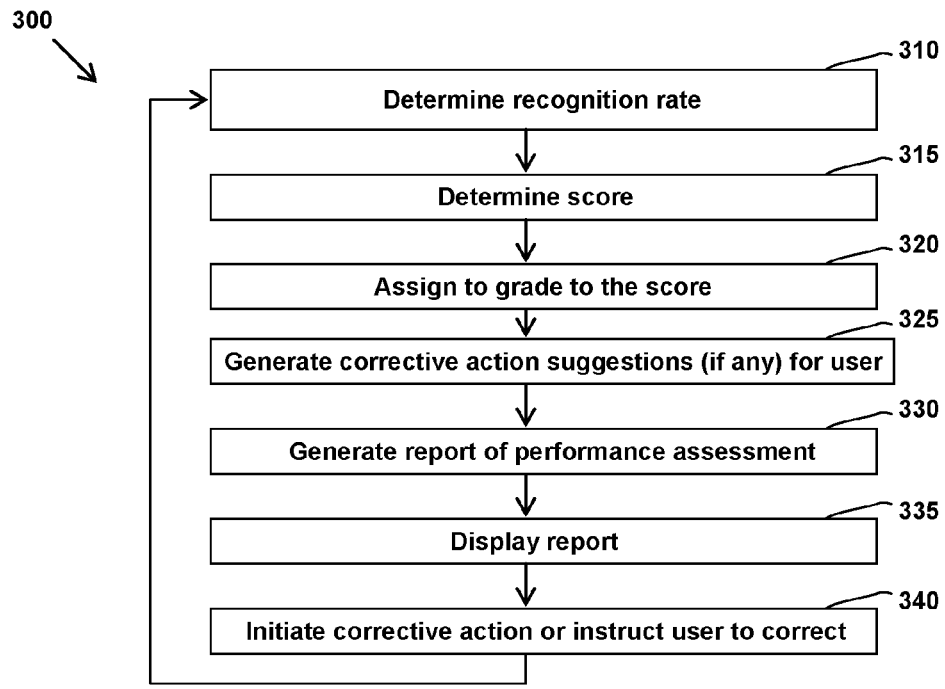
FIG. 3 is a flowchart illustrating a method for assessing and improving the performance of a speech recognition system, according to an example embodiment of the invention.

FIG. 3 is a flowchart illustrating a method for assessing and improving the performance of a speech recognition system for the recognition of a word, according to example embodiments of the invention. It can be understood that this method can also be used to assess the performance of multiple systems and/or for recognition of at least a subset of the words in a vocabulary of a system (such as recognition of the digits in the vocabulary). The method can be performed by a performance assessment module (such as 224 of FIG. 2) and a performance report generator (such as 225 of FIG. 2).

At 310, a recognition rate is determined. In an example embodiment, the recognition rate is an error rate. In another example embodiment, the recognition rate is an accuracy rate. Furthermore in example embodiments, the recognition rate can be determined or estimated or in the following ways: over a window of time; over a window of data observed by the system; per user; over a number of users; per word; over for a set of words; or per a group of consecutively spoken words, such as an utterance, phrase or sentence. In the following discussion, the recognition rate corresponds to recognition of instances of a single word (such as the digit '1'). In other example embodiments, the recognition rate may be a combined recognition rate, corresponding to recognition of the instances of various words (such as the words '1', '2' and '3', for all digits, or for all words in the vocabulary of the system).

At 315, a score is calculated for recognition of the word. In this example embodiment, an error rate is used for the recognition rate and the score is calculated using the equation:

$$\text{score} = (100 - 500 * \text{error rate}) + 5 * (2 - \text{uttlen}) + (25 - \text{SNR}) \quad (1)$$

where,
uttlen is an average number of words in a multi-word utterance, and
SNR is an average speech-to-noise ratio during the multi-word utterances (which is limited to the range of 21-28 dB in an example embodiment).

In another example embodiment, an accuracy rate is used for the recognition rate and the score is calculated using the equation:

$$\text{score} = (100 - 500 * (1 - \text{accuracy rate})) + 5 * (2 - \text{uttlen}) + (25 - \text{SNR}) \quad (2)$$

where,
uttlen is an average number of words in a multi-word utterance, and

SNR is an average speech-to-noise ratio during the multi-word utterances (which is limited to the range of 21-28 dB in an example embodiment).

In other example embodiments, other types of recognition rates can be used, such as a recognition rate based on a count of observations with errors or observations. An example embodiment score calculation considers one or more of the following recognition factors: recognition rate, error rate, accuracy rate, the average number of words in a multi-word utterance (uttlen), the speech-to-noise ratio (SNR) and any other recognition factors as would be known to those skilled in the art. One reasoning behind considering the number of words in a multi-word utterance is that the recognition rate can depend on the number of words in an utterance. For example, a recognition rate that is an utterance error rate typically increases with the number of words in an utterance and a recognition rate that is an utterance accuracy rate typically decreases with the number of words in an utterance. One reasoning behind considering the speech-to-noise ratio is that recognition errors typically increase in a high-noise environment and so the calculation allows the score to be adjusted in view of this. Other example embodiment score calculations can consider other recognition factors such as a background noise level, the number of words in the vocabulary of a speech recognition system, perplexity, grammar complexity or confusability, or any other measure of difficulty of performing a speech recognition task.

At 320, a grade is assigned to the score as follows:

$$A \; 90 <= score$$

$$B \; 80 <= score < 90$$

$$C \; 70 <= score < 80$$

$$D \; score < 70 \qquad (3)$$

where the grades are associated with a performance measurement of the speech recognition system:

| Grade | Description |
|---|---|
| A | Excellent performance |
| B | Good performance where there may be a slight chance for improvement |
| C | Passable performance where there is a good chance for improvement |
| D | Poor performance with a strong need for improvement |

In other example embodiments, the grades are not letters, but are other indications of a rating, such as numbers (e.g. '2', '3' and '4'), symbols (such as '☺','☺', '☺'and '!!!!'), colors or bars. Examples of calculated scores and assigned grades using (1) and (3) respectively are shown in Table 1:

TABLE 1

| error rate | uttlen | SNR | Score | Grade |
|---|---|---|---|---|
| 2% | 3 | 20 | 90 | A |
| 2% | 3 | 25 | 85 | B |
| 2% | 2 | 28 | 87 | B |
| 3% | 2 | 20 | 89 | B |
| 4% | 3 | 25 | 75 | C |
| 6% | 2 | 25 | 70 | C |
| 6% | 3 | 25 | 65 | D |

Examples of calculated scores and assigned grades using (2) and (3) respectively are shown in Table 2:

TABLE 2

| accuracy rate | uttlen | SNR | Score | Grade |
|---|---|---|---|---|
| 98% | 3 | 20 | 90 | A |
| 98% | 3 | 25 | 85 | B |
| 98% | 2 | 28 | 87 | B |
| 97% | 2 | 20 | 89 | B |
| 96% | 3 | 25 | 75 | C |
| 94% | 2 | 25 | 70 | C |
| 94% | 3 | 25 | 65 | D |

Other example embodiment grade calculations can consider other recognition factors such as those identified above for the score calculation, and a measure or measures of performance of a system or systems used by one or more users.

In an example embodiment, at 325 the system automatically generates corrective action suggestions (if any) for the user, based on one or more scores or grades. The system can generate the suggestions for example by using a predefined standard, table, formula or algorithm that considers the score and/or grade and other factors (such as the recognition factor, an environmental factor or corresponding scores and/or performance assessments for systems used by other users in a similar environment) to yield a suggested corrective action. For example, if the grade for a word is less than the grades for recognition of words of systems used by other users in a similar environment, the generated corrective action suggestion could be to instruct the user that he or she should perform an action that causes the model or set of models (for the word or words associated with the low grade) to be modified. The user may retrain, adapt, or otherwise modify the model to improve performance. Other examples of corrective actions include instructing the user to: wait until the system is done speaking before starting to speak, replace a microphone, speak louder, adjust the position of the microphone relative to the user's mouth, move to an that is quieter than the current environment, and/or replace or remove the windscreen from the microphone.

In another example embodiment, 325 is not performed and instead, upon receiving score and/or grade information for a user or multiple users, a supervisor or professional services support person considers the information and other factors (such as environmental factors or corresponding scores and/or grades for systems used by other users in a similar environment) to personally provide a suggested corrective action to a user or users.

At 330, a report of the performance assessment of the system is generated. An example report for a user, showing grades for the particular user and the number of times each word has been observed, "count", is as follows:

| Individual Report for User 1 | | |
|---|---|---|
| Word | Count | Grade |
| 0 | 160 | A |
| 1 | 196 | A |
| 2 | 208 | A |
| 3 | 228 | A |
| 4 | 178 | A |
| 5 | 206 | D |
| 6 | 179 | A |
| 7 | 172 | A |
| 8 | 179 | B |
| 9 | 163 | A |

Recommended corrective action: Retrain Word 5

In this example, grades were calculated and reported for each of the words '0', '1', '2', '3', '4', '5', '6', '7', '8', and '9' for the user, "User 1". Also reported is an automatically generated suggested corrective action to this user to "Retrain Word 5".

An example report for a supervisor, showing grades for multiple users is as follows:

| Supervisory Report - All Users | | | | |
|---|---|---|---|---|
| Word | User 1 Count | User 1 Grade | User 2 Count | User 2 Grade |
| 0 | 160 | A | 170 | A |
| 1 | 196 | A | 201 | B |
| 2 | 208 | A | 176 | A |
| 3 | 228 | A | 188 | A |
| 4 | 178 | A | 190 | B |
| 5 | 206 | D | 221 | A |
| 6 | 179 | A | 164 | A |
| 7 | 172 | A | 163 | A |
| 8 | 179 | B | 191 | A |
| 9 | 163 | A | 165 | A |

Recommended Corrective Actions:
User 1: Retrain Word 5
User 2: None

The systems used by the multiple users may be similar systems and/or may be operated in similar environments. In this example, grades were calculated and reported for each of the words '0', '1', '2', '3', '4', '5', '6', '7', '8', and '9' for the users "User 1" and "User 2". Also reported is an automatically generated suggested corrective action for User 1 to "Retrain Word 5" and no corrective action is suggested for User 2.

Figure 4:
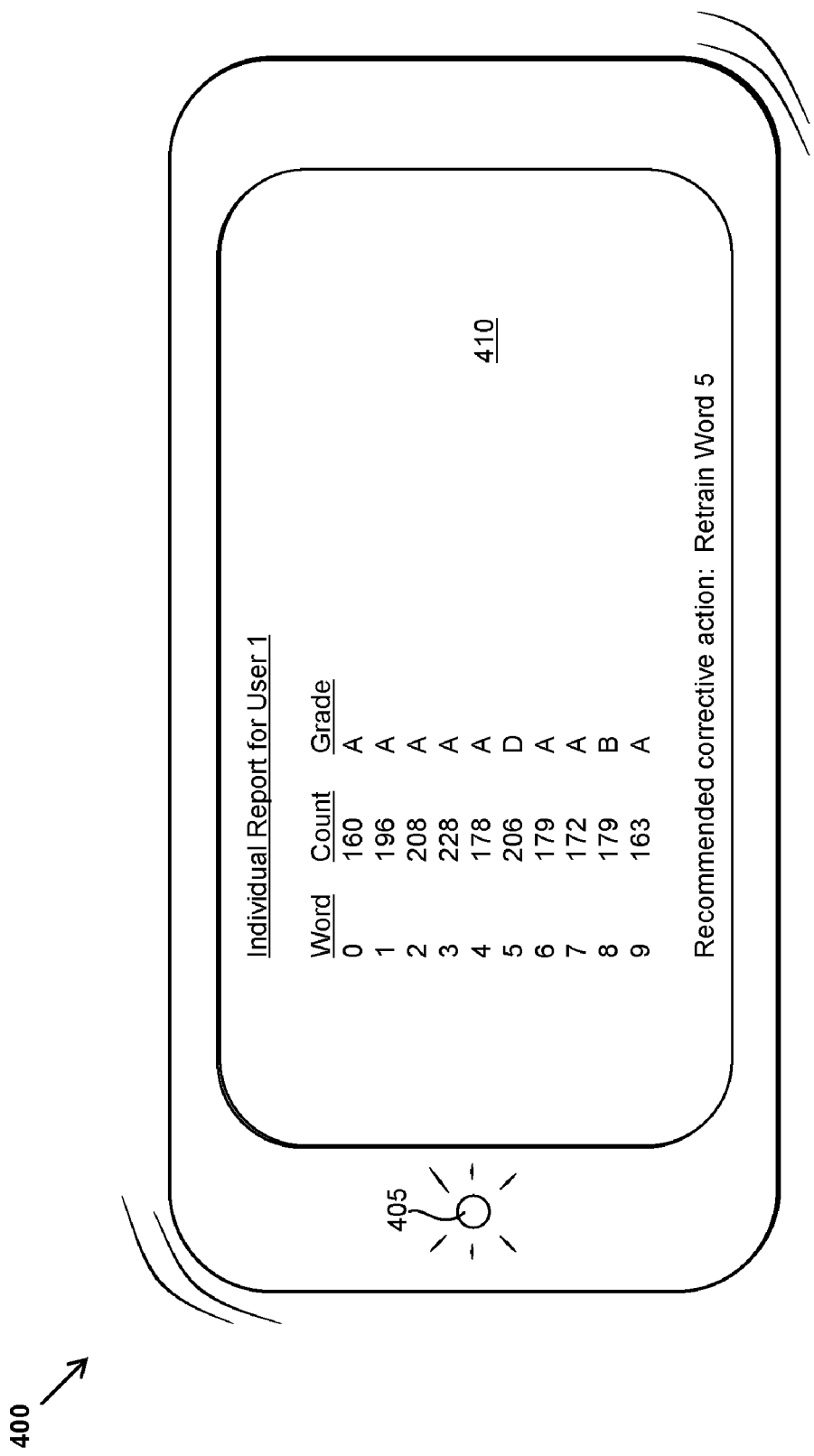
FIG. 4 illustrates a display on a portable terminal, according to an example embodiment of the invention.
Figure 5:
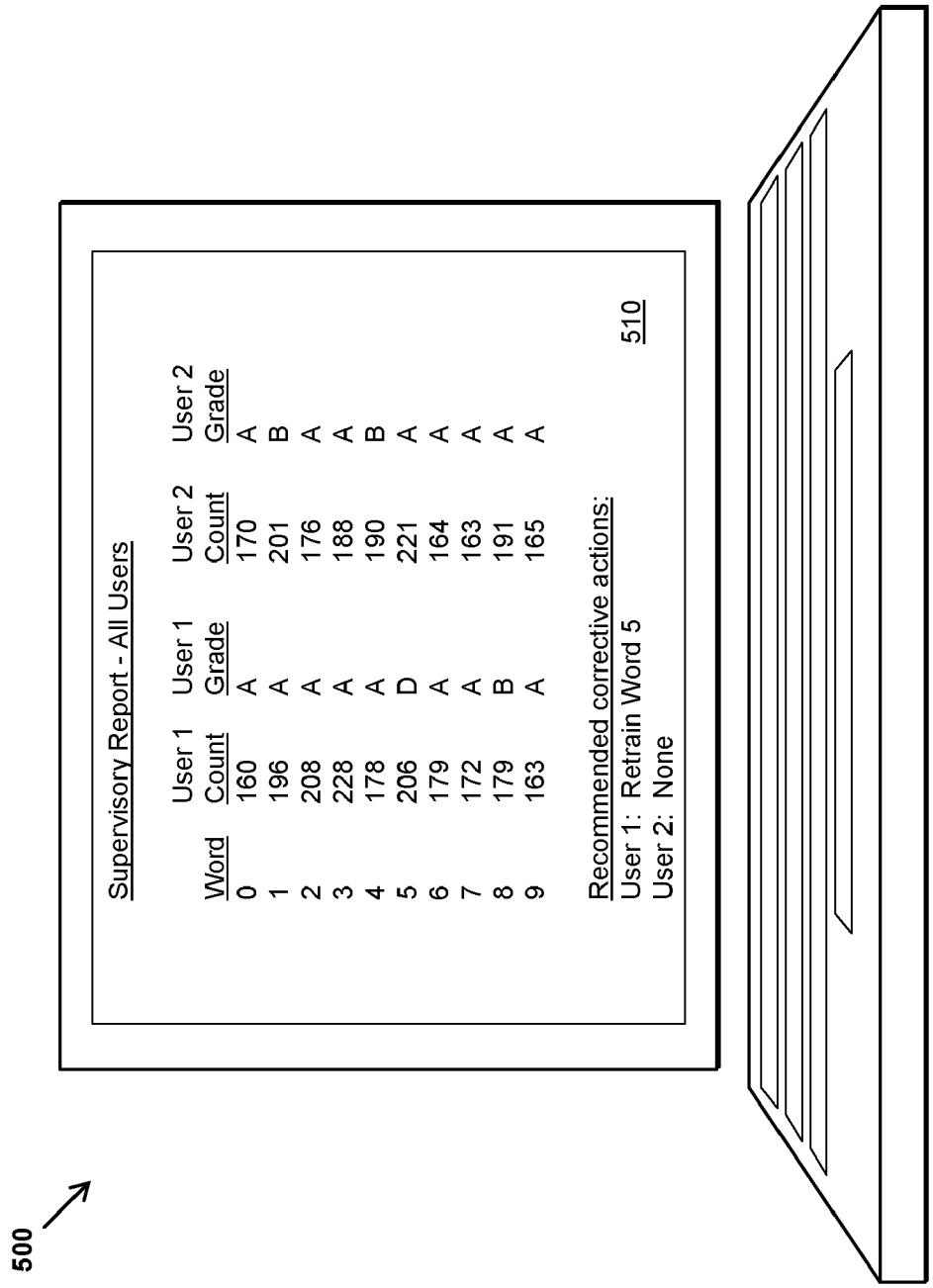
FIG. 5 illustrates a display on a management console, according to an example embodiment of the invention.

At 335, the report is displayed. FIG. 4 illustrates portable terminal 400, having an example embodiment display 410 showing grades for recognition of various words by a speech recognition system used by a particular user. FIG. 5 illustrates a management console 500, having an example embodiment display 510 showing grades for recognition of various words by systems used by multiple users. In an example embodiment, either a computer station or a portable terminal displays either type of report. In another example embodiment, a display like 510 is shown on a web browser of a PC that is connected to a larger network (such as an intranet) in which various user's speech recognition systems are networked, so that performances assessments of the various systems can be viewed at the PC.

At 340, corrective action can be automatically initiated or the user can be instructed to take corrective action. An example of automated initiation of corrective action is the initiation of a retraining session, upon the calculation of a poor grade for the recognition of a particular word. Alternatively, a user can be instructed to take corrective action through an alert mechanism of the portable terminal or through a supervisor or professional services support person. Example alert mechanisms of the portable terminal are physical, visual or sound indicators such as a light on the portable terminal (such as 405 in FIG. 4), a vibrating portable terminal, a displayed message, or a spoken instruction from the portable terminal.

In an example embodiment, the above-described method is performed in real-time, as the system is being used by a user (and other systems used by other users). In another example embodiment, the above described method is performed after the system is used by a user, using log data of the system and user's activities.

Example Embodiment Methods for Controlling Model Adaptation

Figure 6:
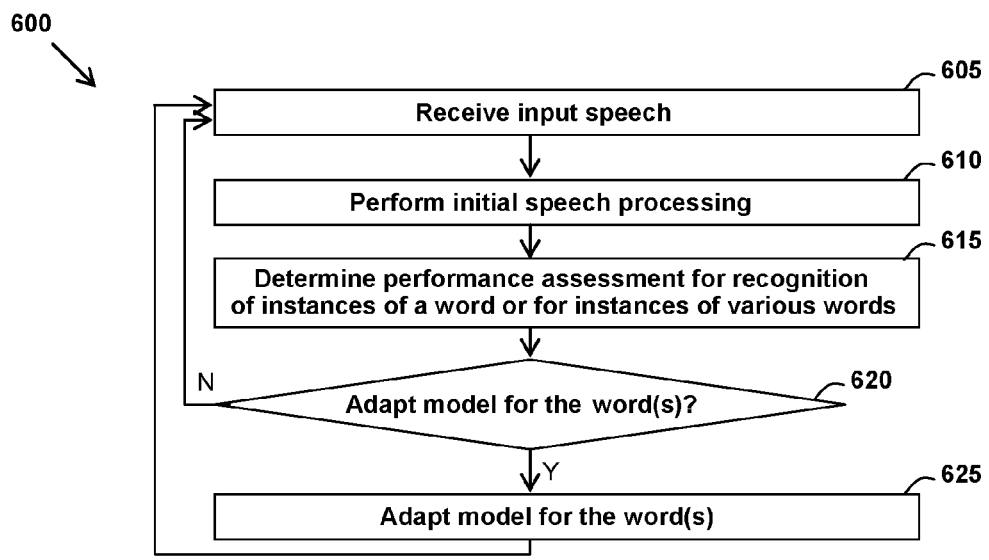
FIG. 6 is a flowchart illustrating a method for controlling model adaptation based on a performance assessment, according to an example embodiment of the invention.

FIG. 6 is a flow chart illustrating a method 600 for controlling or adjusting model adaptation, according to an example embodiment of the invention. It can be executed by components of a speech recognition system, such as the modules illustrated in FIG. 2. At 605, input speech is received by the speech recognition system. At 610, initial speech processing is performed (such as processing of the input speech performed by the signal processor 204, feature generator 206 and speech recognition search algorithm 208 of FIG. 2) for at least one word. At 615 a performance assessment, corresponding to either recognition of instances of a word or for recognition of the instances of various words is determined (by for example performance assessment module 224 of FIG. 2). For example, the performance assessment can be based on recognition errors for the word '1', for the words '1', '2' and '3', for all digits, or for all words in the vocabulary of the system. Furthermore, the performance assessment can be updated based on instances previously and currently input to the system. At 620, a determination is made whether to adapt (by for example the model adaptation control module 217 of FIG. 2) a model for the word or various models for the various words, based on the performance assessment. For example, a determination can be made to adapt the model for the word '1' based on a performance assessment for the word '1'. In another example, a determination can be made to adapt all words that are digits, based on a combined performance assessment for all of the digits. If it was determined that the model(s) should not be adapted, next is 605. If the model(s) should be adapted, it is adapted in 625. After 625 is executed, control returns to 605. Model adaptation in 625 can be performed in the background with control returning to 605 immediately. In other words, the speech recognition system can continue to receive and process speech while the models are being adapted.

In an example embodiment, a performance assessment is compared to a performance assessment threshold to control model adaptation. In other words, an example embodiment makes a comparison of a performance assessment to a performance assessment threshold and adapts at least one model or withholds adapting the model based on the comparison. For example, if the assessment threshold is 'C', and an assessment is 'D', a model associated with the assessment is determined to be adapted (by for example model adaptation and control module 217 of FIG. 2. One reason behind the decision to adapt is that if the assessment is below a particular assessment threshold, the speech recognition system is not performing well and accordingly, model adaptation should be performed.

In example embodiments of the invention, the performance assessment threshold can be a predetermined value, settable by a user, a dynamic value, or it can be adjusted upwardly or downwardly. Moreover, the assessment threshold can be based on factors that affect the achievable performance level of the speech recognition system and those that determine an acceptable performance level for the application in which the system is used. Furthermore, the assessment threshold can be based on a performance assessment of a set of users of like systems, a number of words in an utterance input to the speech recognition system, based on environmental factors (such as background noise level, speech-to-noise ratio, or a measurement of the user's speech level), based on the perplexity of the grammar of a speech recognition system, based on the confusability of the words in the vocabulary or based on a number of words in the vocabulary of a speech recognition system.

Example Embodiments for Model Adaptation

Figure 7:
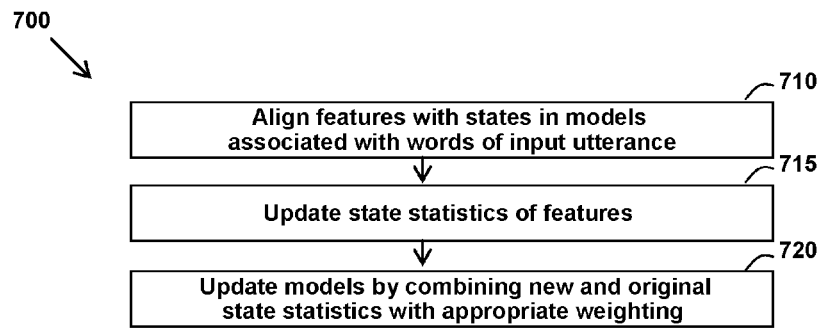
FIG. 7 is a flowchart illustrating a method for model adaptation, according to an example embodiment of the invention.

FIG. 7 is a flow chart illustrating a method 700 for model adaptation, according to an example embodiment of the invention. It can be executed by a component of a speech recognition system, such as the model adaptation and control module 217 of FIG. 2, after a decision has been made to adapt. At 710, the features observed by a speech recognition system corresponding to an input utterance are aligned with the states in the models for the words of the utterance (by for example using the Baum-Welch re-estimation algorithm). At 715, the statistics (for example, means and variances) of the states are updated using the values of the features. At 720, these values are mixed into the models with an appropriate weighting to maintain an appropriate balance between previous training data and new features. Thus, in an example embodiment, new models are created by using the observed features of an input utterance and the existing features of the original models, and the statistics associated with each, are used to create the new models. Additionally, new statistics might be weighted in various fashions to tailor their effect on the original statistics in the model. In an alternative example embodiment, only the new observed features, and information therefrom, are utilized to create the new model. Furthermore, the adaptation could be performed using data from a single user or multiple users. For example, only speech data from an individual user might be used to perform the adaptation, generating a model that is adapted and performs well for that user.

Example Embodiments of Error Rates

There are various example embodiments for determining or estimating the occurrences of possible (or potential or suspected) errors made by a speech recognition system and an error rate (which can be performed by the performance assessment module 224 of FIG. 2 and at 310 of FIG. 3). The error rate can be based on any one or combination of the various speech recognition errors discussed in this present application, such as those in the BACKGROUND section of this present application and those discussed below. For example, the error rate can be the ratio of insertion errors over words input to the system. Or for example, the error rate can be the ratio of insertion, substitution and deletion errors over the words input to the system. Or for example, the error rate can be the combination of the low confidence rate and the substitution rates discussed below. The example embodiment error rates discussed below are based on estimated errors, which are deemed to have occurred based on evaluating system behavior, the expected response and/or user behavior. Thus, these estimated error rates provide an advantage of not requiring a reference transcript of words input to the system and comparison of the system's hypotheses corresponding to the words input to the system.

Low Confidence Rate

Figure 8:
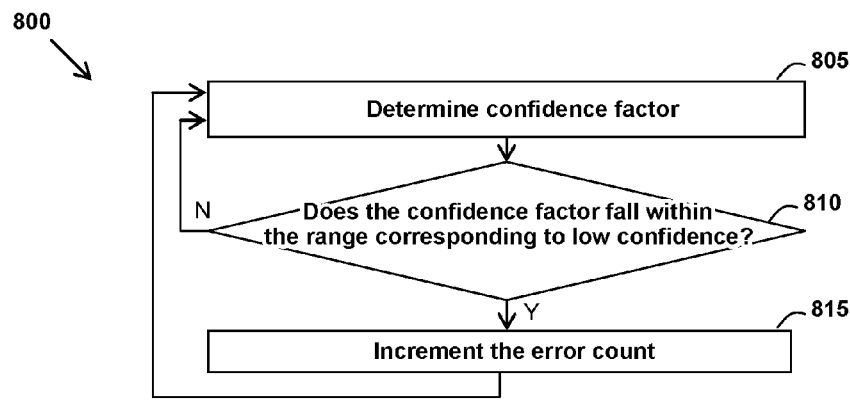
FIGS. 8-10 are flowcharts illustrating methods for estimating an error rate, according to example embodiments of the invention.

In an example embodiment of the invention, an identification or count of occurrences of possible errors made by a speech recognition system called low confidence recognitions, can be used to determine an estimate of a low confidence rate or an estimate of an error rate. FIG. 8 is a flow chart illustrating a method 800 for identifying errors, which can be executed by components of a speech recognition system, such as the performance assessment module 224 of FIG. 2. The low confidence rate is the rate at which a word is recognized with a confidence factor within a certain range corresponding to low confidence that the system recognized the word correctly. In other words, the low confidence rate is the frequency at which a word was recognized by the speech recognition system with a confidence factor that is relatively low depending on the recognizer and application in which the speech recognition system is used. Note that a low confidence rate does not necessarily measure errors by the speech recognition system, but the low confidence rate (or a fraction of its value) can be used in addition to or in place of error rate estimates where error rates (or error rate estimates) are used.

In FIG. 8, at 805, the confidence factor for a hypothesized word is determined. (This confidence factor can be generated by search algorithm 208 of FIG. 2 and supplied to the performance assessment module 224 of FIG. 2.) At 810, the confidence factor is compared with a range of values corresponding to low confidence that the system recognized the word correctly for the application in which the system is used. If at 810 it is determined that the confidence factor is outside of the low confidence range, control is returned to 805. If it is determined at 810 that the confidence factor is within the low confidence range, the error count is incremented at 815. After 815, control returns to 805. The error count in 815 may then be combined with counts of other error types to generate an error rate.

An example embodiment, which uses a low confidence rate, also considers when a word is from a hypothesis generated by the system that matches an expected response in counting errors for an error rate estimation. (U.S. patent application Ser. No. 11/051,825, and the BACKGROUND section of this present application describes scenarios in which an expected response from a user is processed by a speech recognition system. An expected response can be defined as a response that the system expects to receive from the user, as a result of the application in which the system is used). In an example embodiment in the referenced patent application, a matching algorithm of the system normally requires that the system's hypothesis is accepted only if a confidence factor for the hypothesis exceeds an acceptance threshold. However, when the system's most likely hypothesis matches an expected response, the hypothesis is more favorably treated so that the hypothesis may be accepted by the system. The reasoning behind the favorable treatment despite the relatively low confidence factor is that a hypothesis matching an expected response usually indicates a high probability of correct recognition.

Turning back to the example embodiment of the invention, in which the error rate is a low confidence rate, responses that match the expected response and have a relatively low confidence factor for the application in which the system is used are counted as errors for an error rate estimation. Although a recognition error may not have actually occurred (because the system's hypothesis was correctly accepted due to the hypothesis matching the expected response as described in referenced U.S. patent application Ser. No. 11/051,825), in this example embodiment, a word with a relatively low confidence is counted as an error for an error rate estimation due to the relatively low confidence factor. The range of confidence factors for which a word is counted as a low confidence could be, for example, between the adjusted acceptance threshold and the original, unadjusted acceptance threshold. More generally, the confidence factor thresholds or range for the counting low confidence errors do not need to match the acceptance threshold and adjusted acceptance threshold in the referenced patent application. The range could be between two other thresholds, including a high confidence threshold, which is higher than the acceptance threshold and indicates the boundary between low and high confidence. In this example embodiment, the range of confidence factors used for the low confidence rate is determined based on the application in which the speech recognition system is used.

Substitution Rate

In an example embodiment of the invention, an identification or count of occurrences of possible substitution errors made by a speech recognition system can be used to determine an estimate of a substitution error rate or an estimate of an error rate. The substitution rate is the rate at which substitution errors (such as the substitution errors defined in the BACKGROUND section of this present application) are made by a system. In an example embodiment, a hypothesis generated by the speech recognition system is compared to an expected response and a substitution error occurs if the system replaces a word in the expected response with a word an incorrect word in the hypothesis. For example, if the system recognizes "1-5-3" and the expected response is "1-2-3", a substitution error is counted because it is deemed that the system made one substitution: substituting the '5' for the '2'. In other words, if the hypothesis and the expected response do not match word-for-word, but do mostly match, (i.e. the hypothesis and the expected response match except for a predetermined number of words), it is a reasonable conclusion that a word substitution error has occurred. (The predetermined number of words depends upon the application. For example, an application that uses three-word hypotheses or utterances may define "mostly match" as matching word-for-word except for one word. An application that uses five-word hypotheses or utterances may define "mostly match" as matching word-for-word except for two words.)

Repeated Utterances

Figure 9:
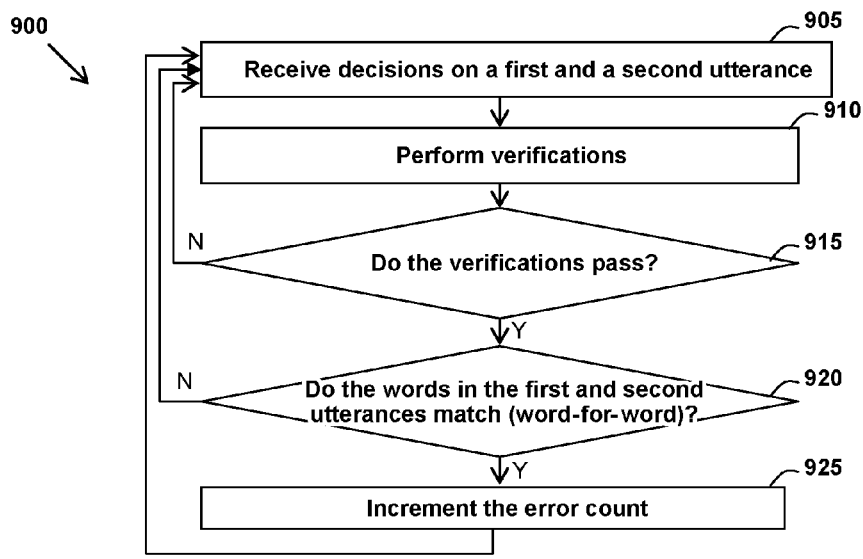
Figure 10:
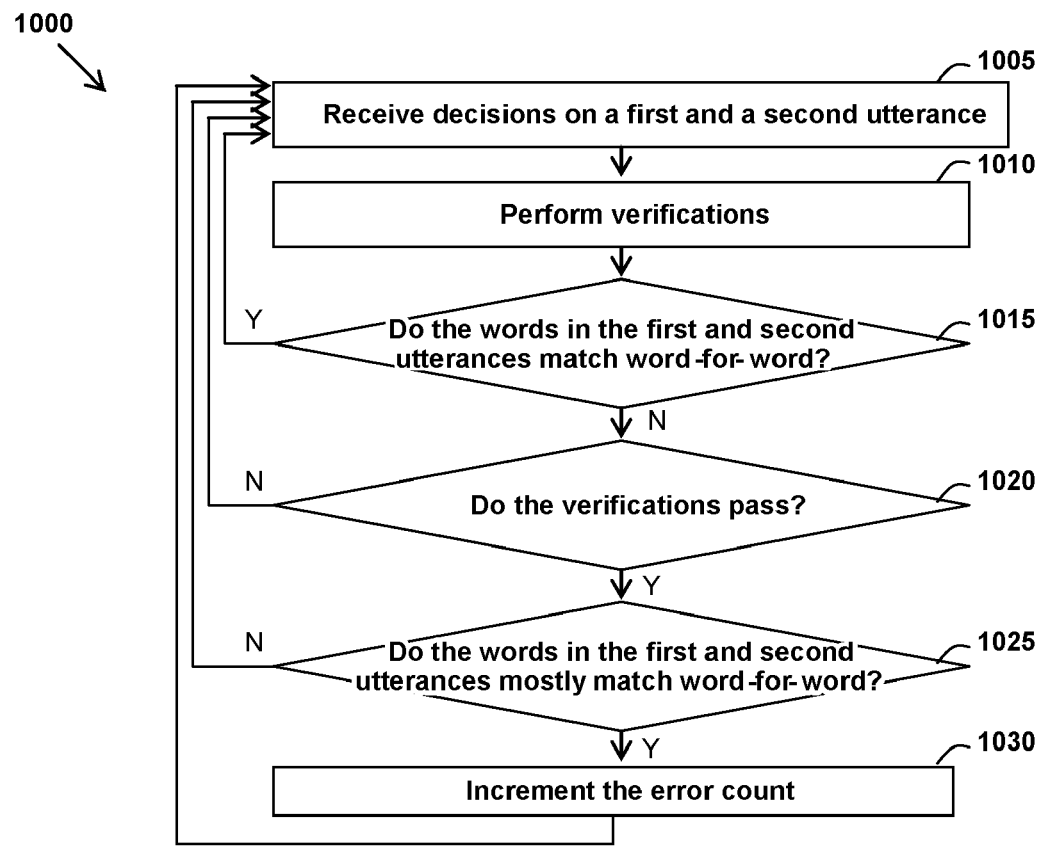
Figure 3:
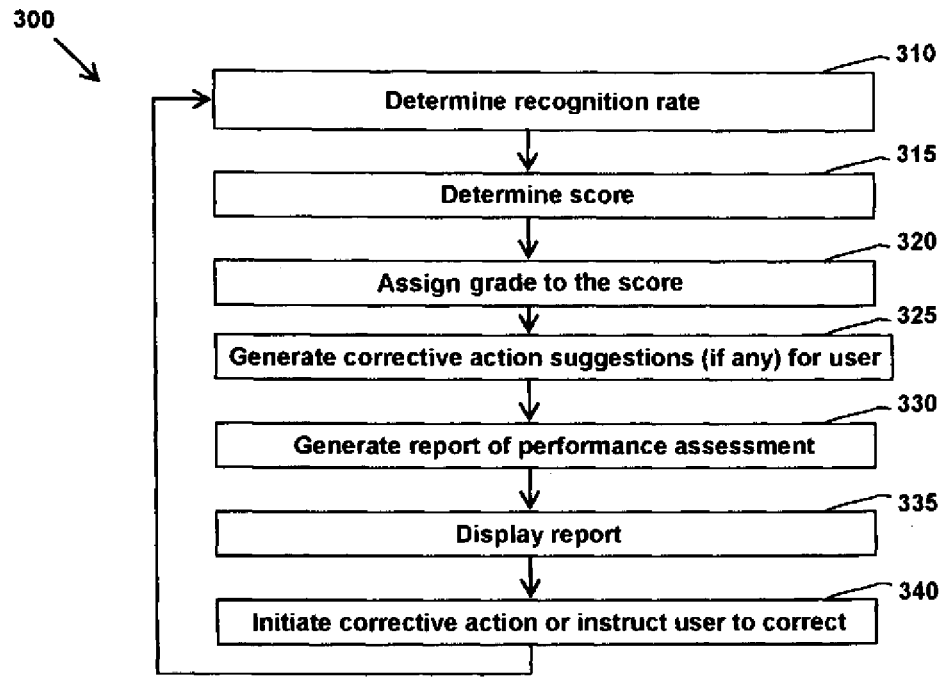
Figure 6:
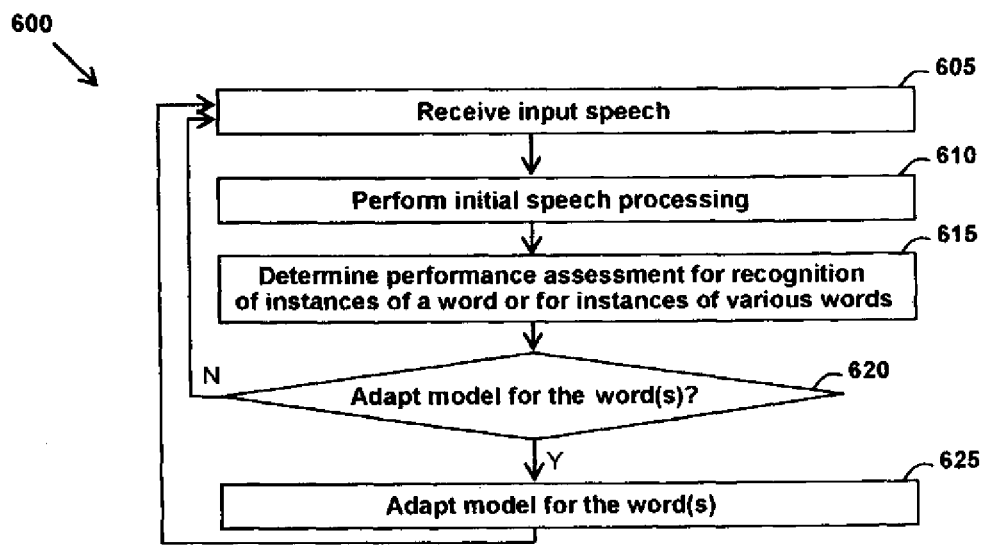

Yet in other example embodiments, the error rate is based on a recognition error made by the speech recognition system that is identified after comparing the speech recognition system's decision on its hypothesis of at least two consecutive or proximate utterances. The decision can occur after the speech recognition system has processed the incoming utterances (such as at 218 of FIG. 2, after the acceptance algorithm in 212 of FIG. 2 is executed). The recognition error can be, for example, to reject the system's hypothesis of an incoming utterance, after which the user repeats the utterance, in response to the system's response or lack of one. Or for example, the recognition error can be to substitute a word that speech recognition system is unable to recognize, with another word or "garbage" word, in the speech recognition system output. FIGS. 9-10 illustrate example embodiment methods to estimate these types of error rates.

Reject and Repeat

FIG. 9 is a flow chart illustrating a method 900 of an example embodiment error rate for identifying possible occurrences of errors made by a speech recognition system. The count of the possible occurrences of errors can be used to determine an estimate of an error rate. Method 900 can be executed by a component of a speech recognition system, such as error rate calculation module 210 of FIG. 2. In this embodiment, the determination of whether the speech recognition system made an error is made when the speech recognition system receives at least two consecutive or proximate utterances. The system behavior and user behavior is as follows: the system rejects its hypothesis of the first utterance; the user repeats the first utterance in the second utterance; and the system accepts its hypothesis of the second utterance. The first and second hypotheses generated by the system substantially match. In other words, the hypotheses match word-for-word but a hypothesis may or may not also include a recognized model that is considered to be negligible for this particular error determination. For example, a hypothesis could include a recognized model indicating a user's breath or sigh and these recognized models may or may not be considered negligible for this particular error determination. (The determination of whether a recognized model is negligible depends upon the particular speech recognition system and the application in which it is used.) An example is as follows: a user speaks a first utterance "1-2-3", the system correctly recognizes it (i.e. generates a hypothesis of "1-2-3") but rejects its hypothesis because of a low confidence factor; the user repeats "1-2-3" in a second utterance and the system correctly recognizes it (i.e. generates a hypothesis of "1-2-3") and accepts its hypothesis. A rationale behind this type of error detection mechanism is that the user repeats himself/ herself because the system did not recognize the first utterance. Since the system accepts its hypothesis of the second utterance, one could reasonably assume that the system should have accepted its hypothesis of the first utterance and that it erred in not doing so. This heuristic can alternatively require that the two utterances are spoken within a predetermined amount of time of each other, or further refined by also requiring that utterances are spoken consecutively.

In FIG. 9, at 905, decisions made by a speech recognition system (such as at 218 of FIG. 2) on a first and second utterance are received for processing by a performance assessment module (such as 224 of FIG. 2). At 910, verifications are performed. These verifications can include one or more of the following conditions: verifying that system's hypotheses of those utterances contain multiple words; verifying that the system's hypothesis of the second utterance contains all accepted words; verifying that there was at least one rejected word in the system's hypothesis for the first utterance; verifying that the hypotheses match the expected response (if there is one). At 915, if the verifications pass, next is 920. Otherwise, control returns to 905. At 920, the words in the first and second hypotheses are compared word-for-word to find if they match. For example, if the first hypothesis is "one-two-three" and the second hypothesis is "one-three-three", there is a mismatch. If the hypotheses match word-for-word, there is a high probability that an incorrect rejection error has occurred, with the reasoning that the user repeated himself and the speech recognizer recognized the second utterance correctly. If the hypotheses match word-for-word, next is 925. Otherwise, control returns to 905. At 925, the error count is incremented and then control returns to 905. The error count in 925 may then be combined with counts of other error types to generate an overall error rate.

Substitute and Repeat

FIG. 10 is a flow chart illustrating a method 1000 of an example embodiment for identifying possible occurrences of errors made by a speech recognition system. The count of the possible occurrences of errors can be used to determine an estimate of an error rate or an estimate for part of an error rate. Method 1000 can be executed by a component of a speech recognition system, such as error rate module 210 of FIG. 2. In this embodiment, determination of whether the speech recognition system made an error is made when the speech recognition system receives at least two consecutive or proximate utterances and the system substitutes a word in its hypothesis of the first utterance and recognizes and accepts all of the words in its hypothesis of the second utterance. An example is as follows: a user speaks a first utterance "1-2-3"; the system misrecognizes it (e.g. generates a hypothesis "1-5-3") and accepts its hypothesis; the user repeats "1-2-3" in a second utterance within a proximity of the first utterance; the system correctly recognizes it (i.e. generates a hypothesis "1-2-3") and accepts its hypothesis. A rationale behind this method of detecting errors is that if the two utterances are spoken consecutively or within a proximity of each other, and if the system accepts its hypothesis of the second utterance, then the system likely made a substitution in its hypothesis of the first utterance. There are heuristics that may be used to guard against the system considering consecutive or proximate recognitions differing by a single word as containing a substitution error when in fact they do not. The heuristics include checking for one or more of the following possible conditions: there were no intervening utterances that indicate that the first utterance was correctly recognized by the system; the two utterances being compared represent the same piece of information being entered into the system, for example, the two utterances being compared occurred at the same position in the dialogue between the user and the recognition system or in response to the same prompt; the two utterances were spoken within a predetermined amount of time or, in other words, the time between the two utterances being compared was short enough to suggest that the user was repeating the initial utterance.

In FIG. 10, at 1005, decisions made by a speech recognition system (such as at 218 of FIG. 2) on a first and second utterance are received for processing by a performance assessment module (such as 224 of FIG. 2). At 1010, verifications are performed. These verifications improve the accuracy of the estimate of the substitution error rate and can include one or more of the following: verifying that the utterances were spoken consecutively or within a proximity of each other; verifying that the system's hypotheses of the utterances contain multiple words; verifying that the system's hypotheses of the utterances contain all accepted words; verifying that the user was prompted for the same information by the system both times; verifying that the first hypothesis does not match the expected response (if there is one); verifying that the second hypothesis does match the expected response (if there is one); and checking for a condition indicating a substitution error occurred (such as those described above). At 1015, the words in the system's hypotheses of the first and second utterances are compared word-for-word to see if they match. If the hypotheses do not match word-for-word, next is 1020. Otherwise, control returns to 1005. At 1020, if the verifications pass, next is 1025. Otherwise, control returns to 1005. At 1025, the words in system's hypotheses of the first and second utterances are compared word-for-word to find how closely they match. For example, if the first hypothesis is "1-2-3" and the second hypothesis is "1-5-3", there is a mismatch of one word. In this case, the '5' was substituted for the '2'. If the hypotheses do not match word-for-word but do mostly match, (e.g. the hypotheses match except for one word), it is a reasonable conclusion that a word substitution error has occurred, with the reasoning that the system performed verifications such as checking for at least one condition indicating a substitution error occurred, the user repeated the same utterance, the system recognized the second utterance correctly, and the system incorrectly substituted in its hypotheses of the first utterance. (The definition of "mostly match" depends upon the application. For example, an application that uses five-word hypotheses or utterances may define "mostly match" as matching word-for-word except for two words.) If the hypotheses mostly match word-for-word, next is 1030 where the error count is incremented followed by control returning to 1005. The error count in 1030 may then be combined with counts of other error types to generate an overall error rate.

The same approach as in the previous paragraph can be used to identify deletion due to garbage errors where a content word is recognized as garbage in a first utterance, then correctly recognized in the next utterance. By comparing the recognition results of the two utterances and using verifications such as those described above, one can detect the error. For example, if the system's hypothesis of the first utterance is "1-GARBAGE-3" and the system's hypothesis of the second utterance is "1-5-3", there is a mismatch of one word, and it becomes a reasonable assumption that the speech recognition system made an error in its hypothesis of the first utterance. Again, similar verifications as described above may be used to guard against the system considering a correct observation to be in error.

The same approach as described above in the discussion of FIG. 10 can also be used to detect other types of errors, such as a deletion due to rejected substitution error. An example of a deletion due to rejected substitution error is as follows. A user speaks a first utterance "1-5-3" and the system generates a hypothesis "1-2-3", but the system rejects the '2' in its hypothesis. The user repeats himself/herself in a second utterance "1-5-3" within a proximity of the first utterance and the system recognizes it (i.e. generates a hypothesis "1-5-3") and the system accepts its hypothesis. When the system recognized and rejected the '2' in its hypothesis of the first utterance, the system made a deletion due to rejected substitution error. The method for detecting this type of error is similar to that described in the discussion of FIG. 10, with the difference that the system's hypothesis of the first utterance does not need to contain all accepted words.

Correction Rate

In an example embodiment error rate for a speech recognition system, a correction rate at which a user provides feedback to the system can be used as an estimate of an error rate or an estimate for part of an error rate. The reasoning behind using a correction rate to estimate an error rate or estimate part of an error rate is that when a correction is commanded to the system, it may indicate that an error occurred. Examples of user feedback are described in the BACKGROUND section of this present application. The correction rate can include the rate at which the user indicates that the system made a mistake. Furthermore, the user may provide feedback in response to the system requesting feedback, such as asking the user to confirm a hypothesis generated by the system or asking the user to identify what word was spoken by the user. The feedback may include a word indicating aggravation by the user or the feedback may be a correction command to the system, such as "back-up" or "erase".

Recognition Rate Considerations

In determining or estimating the recognition rate (error rate, accuracy rate or other type of recognition rate), considerations can be made for the amount of time and data needed to determine or estimate a recognition rate that is useful for the application in which the speech recognition system is used. One example consideration is that the recognition rate is determined or estimated for speech input to the speech recognition system over a predetermined period of time. Another example consideration is that the recognition rate is determined or estimated for speech input to the speech recognition system over a predetermined number of utterances, words, or hypotheses.

Another example consideration is that the recognition rate is determined or estimated from hypotheses of utterances collected over a moving or sliding window or a collection period that is dynamic in period of time and/or size of data. As a result, the recognition rate is determined or estimated over a period when useful data has been collected. For example, a moving or sliding window can cover a collection of data taken from equal periods in noisy environment and a quiet environment to offset any favoring by the speech recognition system in one of those environments. Other examples of moving, sliding windows are those that collect data only during recent use (e.g. the last half-hour) of the speech recognition system, collecting data for time spent by a particular user (e.g. since the user started using the system), or collecting a certain amount of data regardless of the time spent collecting the data (e.g. the last one-hundred hypotheses).

It can be understood by those skilled in the art that in other example embodiments of the invention, other recognition rates can be used in place of a word recognition rate, such as a syllable recognition rate, a phoneme recognition rate, a phrase recognition rate, an utterance recognition rate, and a sentence recognition rate. For example, an utterance recognition rate can be defined as the percentage or ratio of either correctly recognized utterances or utterances with errors made by a system over the number of utterances input to the system.

In addition, it will be evident to one skilled in the art that the various methods to identify possible errors or correct observations can process the same hypotheses, but safeguards must be taken to avoid double counting, as some possible errors or correct observations may be counted by more than one method.

The invention, in its various example embodiments, may be implemented directly in the software of a speech recognition system. That is, the improvements are actually part of the speech recognition system. Alternatively, the invention does not have to be built into the speech recognition system. Rather, the invention or parts of the invention may be implemented in a separate program or application, which may be utilized by a speech recognition system to provide the benefits of the invention. In other words, separate applications or software modules may be utilized to handle any of the steps in FIG. 3 in accordance with the principles of the invention. For example, an application may interface with a speech recognition system to determine a performance assessment and/or control when and how models are adapted.

In the foregoing description, the invention is described with reference to specific example embodiments thereof. The specification and drawings are accordingly to be regarded in an illustrative rather than in a restrictive sense and it is not the intention of the applicants to restrict or in any way limit the scope of the appended claims to such detail. It will, however, be evident to those skilled in the art that additional advantages and modifications can be made, in a computer program product or software, hardware or any combination thereof, without departing from the broader spirit and scope of the invention will readily appear. Software embodiments may include an article of manufacture on a machine accessible or machine readable medium having instructions. Furthermore, software embodiments may be distributed or downloaded via a network or email. The instructions on the machine accessible or machine readable medium may be used to program a computer system such as for example, a PC, cell phone, industrial mobile computer, PDA, electronic headset or other electronic device to perform the methods described herein. The machine-readable medium may include, but is not limited to, non-volatile memory, floppy diskettes, optical disks, CD-ROMs, and magneto-optical disks or other type of media/machine-readable medium suitable for storing or transmitting electronic instructions. Furthermore, departures may be made from the application in which the invention is described without departing from the spirit and scope of the invention. For example, the example speech recognition system described herein has focused on wearable terminals. However, the principles of the invention are applicable to other speech recognition environments as well.

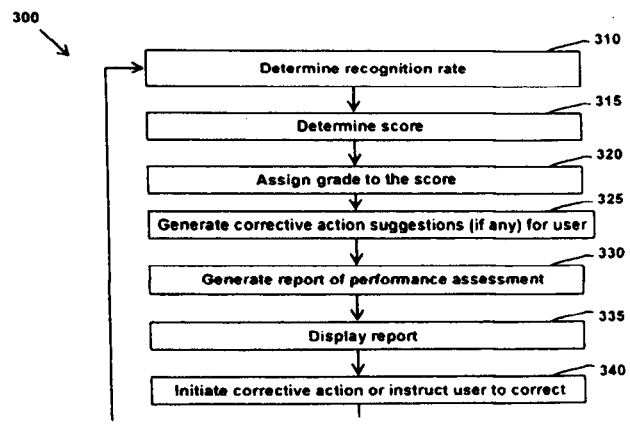

What is claimed is:

1. A method for improving performance of a speech recognition system comprising:
    operating a processor to determine a performance of the system based on either recognition of instances of a word or recognition of instances of various words among a set of words, and
    determining a corrective action based on the performance, to improve the performance.

2. The method of claim 1, further comprising communicating the corrective action to a user.

3. The method of claim 1, further comprising initiating the corrective action automatically.

4. The method of claim 1, wherein the method is performed as the system is being used by a user.

5. The method of claim 1, wherein the method is performed after the system is used by a user for a period of time, using information from a log of system activity.

6. The method of claim 1, wherein the corrective action is for the user to retrain a word or set of words.

7. The method of claim 1, wherein the corrective action is for the user to perform an action that causes a model or set of models to be modified.

8. The method of claim 1, wherein the corrective action is for the user to speak louder.

9. The method of claim 1, wherein the corrective action is for the user to move the microphone.

10. The method of claim 1, wherein the corrective action is for the user to replace a microphone.

11. The method of claim 1, wherein determining the performance is based on estimated errors, which are estimated from evaluating system behavior.

12. The method of claim 11, wherein the estimated errors estimated from evaluating system behavior correspond to proximate utterances input to the system by the user.

13. The method of claim 1, wherein determining the performance is based on estimated correct observations by the system estimated from evaluating system behavior.

14. The method of claim 1, wherein determining the performance is based, at least in part, on identifying occurrences for which instances of the word or instances of the various words are recognized within a certain confidence factor range.

15. The method of claim 1, wherein determining the performance uses, at least in part, identifying occurrences for which the system rejects a first hypothesis of a first utterance, followed by the system accepting a second hypothesis of the second utterance, wherein the first and second hypotheses substantially match word-for-word.

16. The method of claim 1, wherein determining the performance uses, at least in part:
    identifying occurrences when the system generates first and second hypotheses of two utterances and the system accepts the second hypothesis, wherein the two hypotheses do not match word-for-word, but the hypotheses mostly match word-for-word.

17. The method of claim 1, wherein determining the performance uses, at least in part:
    identifying occurrences when a hypothesis generated by the system does not match an expected response word-for-word, but the hypothesis mostly matches the expected response word-for-word.

18. The method of claim 1, wherein determining the performance uses, at least in part:
    identifying occurrences when a user provides feedback to the system.

19. The method of claim 1, wherein determining the corrective action is based on a recognition factor.

20. The method of claim 1, wherein determining the corrective action is based on an environmental factor.

21. The method of claim 1, wherein determining the corrective action is based on performance of a system or systems used by one or more users.

22. The method of claim 1, wherein the performance is based on an error rate comprising:
a rate at which the system rejects a first utterance, followed by a user repeating the first utterance in a second utterance, followed by the system accepting the second utterance.

23. The method of claim 1, wherein the performance is based on an error rate comprising:
a rate at which the system substitutes an instance of the word or one of the various words in the system's hypothesis for a first utterance, followed by a user repeating the first utterance in a second utterance, followed by the system recognizing and accepting the second utterance.

24. The method of claim 1, wherein the performance is based on an error rate comprising:
a substitution rate at which the word an instance of the word or one of the various words is incorrectly recognized as another word, when comparing a hypothesis generated by the system to an expected response.

25. An apparatus for improving performance of a speech recognition system comprising:
a processor that is configured to determine a performance of the speech recognition system based on either recognition of instances of a word or recognition of instances of various words among a set of words;
the processor further configured to determine a corrective action based on the previously determined performance to improve the performance of the speech recognition system.

26. The apparatus of claim 25, wherein the processor is adapted to communicate the corrective action to a user.

27. The apparatus of claim 25, wherein the processor is adapted to initiate the corrective action automatically.

28. The apparatus of claim 25, wherein the apparatus determines the performance and determines the corrective action as the system, is being used by a user.

29. The apparatus of claim 25, wherein the apparatus determines the performance and determines the corrective action after the system is used by a user for a period of time, using information from a log of system activity.

30. The apparatus of claim 25, wherein the performance is determined using estimated errors, which are estimated from evaluating system behavior.

31. The apparatus of claim 25, wherein the performance is determined using estimated correct observations, which are estimated from evaluating system behavior.

32. The apparatus of claim 30, wherein the estimated errors include occurrences for which instances of the word or instances of the various words are recognized within a certain confidence factor range.

33. The apparatus of claim 30, wherein the estimated errors include occurrences for which the system rejects a first hypothesis of a first utterance, followed by the system accepting a second hypothesis of the second utterance, wherein the first and second hypotheses substantially match word-for-word.

34. The apparatus of claim 30, wherein the estimated errors include occurrences when the system generates first and second hypotheses of two utterances, and the system accepts the second hypothesis, wherein the two hypotheses do not match word-for-word, but the hypotheses mostly match word-for-word.

35. The apparatus of claim 30, wherein the estimated errors include occurrences when a hypothesis generated by the system does not match an expected response word-for-word, but the hypothesis mostly matches the expected response word-for-word.

36. The apparatus of claim 30, wherein the estimated errors include occurrences of when a user provides feedback to the system.

37. The apparatus of claim 25, wherein determining the corrective action is based on a recognition factor.

38. The apparatus of claim 25, wherein determining the corrective action is based on an environmental factor.

39. The apparatus of claim 25, wherein determining the corrective action is based on performance of a system or systems used by one or more users.

40. The apparatus of claim 25, wherein the performance is based on an error rate comprising:
a rate at which the system rejects a first utterance, followed by a user repeating the first utterance in a second utterance, followed by the system accepting the second utterance.

41. The apparatus of claim 25, wherein the performance is based on an error rate comprising:
a rate at which the system substitutes an instance of the word or one of he various words in the system's hypothesis for a first utterance, followed by a user repeating the first utterance in a second utterance, followed by the system recognizing and accepting the second utterance.

42. The apparatus of claim 25, wherein the performance is based on an error rate comprising:
a substitution rate at which the word an instance of the word or one of the various words is incorrectly recognized as another word, when comparing a hypothesis generated by the system to an expected response.

* * * * *

UNITED STATES PATENT AND TRADEMARK OFFICE
CERTIFICATE OF CORRECTION

Page 1 of 4

| | |
|---|---|
| PATENT NO. | : 8,255,219 B2 |
| APPLICATION NO. | : 13/044076 |
| DATED | : August 28, 2012 |
| INVENTOR(S) | : Keith Braho et al. |

It is certified that error appears in the above-identified patent and that said Letters Patent is hereby corrected as shown below:

The title page showing the illustrative figure should be deleted to be replaced with the attached title page.

In the Drawings:

The drawing sheet, consisting of Fig. 3, should be deleted to be replaced with the drawing sheet, consisting of Fig. 3, as shown on the attached pages.

In the Specification:

In Column 4, Line 50 reads "... person (such a supervisor . . ." and should read --person (such as a supervisor . . .--.

In Column 5, Line 19 reads "FIG. 1 illustrates a illustrates a view of . . ." and should read --FIG. 1 illustrates a view of . . .--.

In Column 9, Line 53 reads ". . . those need to for the particular . . ." and should read --those needed for the particular . . .--.

In Column 9, Lines 62-63 reads "module 217, determines the criteria . . ." and should read --module 217 determines the criteria . . .--.

In Column 10, Line 36 reads". . . can be determined or estimated or in the following ways:. . ." and should read --can be determined or estimated in the following ways: . . .--.

In Column 12, Line 37 reads ". . . move to an that is quieter than . . ." and should read --move to an area that is quieter than--.

Signed and Sealed this
Eighth Day of July, 2014

Michelle K. Lee
*Deputy Director of the United States Patent and Trademark Office*

In Column 17, Lines 12-13 read ". . . replaces a word in the expected response with a word an incorrect word in the hypothesis." and should read --. . . replaces a word in the expected response with an incorrect word in the hypothesis.--.

In Column 21, Lines 42-47 read "It will, however, be evident to those skilled in the art that additional advantages and modifications can be made, in a computer program product or software, hardware or any combination thereof, without departing from the broader spirit and scope of the invention will readily appear." and should read --It will, however, be evident to those skilled in the art that additional advantages and modifications can be made, in a computer program product or software, hardware or any combination thereof, without departing from the broader spirit and scope of the invention.--.

In the Claims:

In Column 23, Lines 23-24, CLAIM 24 read ". . . a substitution rate at which the word an instance of the word or one of the various words . . ." and should read --a substitution rate at which the word, an instance of the word or one of the various words . . .--.

In Column 23, Line 43, CLAIM 28 reads ". . . as the system, is being used by a user." should read --as the system is being used by a user.--.

In Column 24, Line 41, CLAIM 41 reads ". . . word or one of he various words . . ." should read --word or one of the various words--.

In Column 24, Line 47, CLAIM 42 reads "a substitution rate at which the word an instance of the word or one of the . . ." should read --a substitution rate at which the word, an instance of the word or one of the. . . --.

(12) United States Patent
Braho et al.

(10) Patent No.: US 8,255,219 B2
(45) Date of Patent: *Aug. 28, 2012

(54) METHOD AND APPARATUS FOR DETERMINING A CORRECTIVE ACTION FOR A SPEECH RECOGNITION SYSTEM BASED ON THE PERFORMANCE OF THE SYSTEM

(75) Inventors: Keith Braho, Murrysville, PA (US); Jeffrey Pike, Murrysville, PA (US); Amro El-Jaroudi, Pittsburgh, PA (US); Lori Pike, Murrysville, PA (US); Michael Laughery, Monroeville, PA (US)

(73) Assignee: Vocollect, Inc., Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/044,076

(22) Filed: Mar. 9, 2011

(65) Prior Publication Data
US 2011/0161083 A1 Jun. 30, 2011

Related U.S. Application Data

(60) Division of application No. 11/688,916, filed on Mar. 21, 2007, now Pat. No. 7,949,533, which is a continuation-in-part of application No. 11/539,456, filed on Oct. 6, 2006, now Pat. No. 7,827,032, which is a continuation-in-part of application No. 11/331,649, filed on Jan. 13, 2006, now abandoned, which is a continuation-in-part of application No. 11/051,825, filed on Feb. 4, 2005, now Pat. No. 7,865,362.

(60) Provisional application No. 60/788,622, filed on Apr. 3, 2006, provisional application No. 60/788,606, filed on Apr. 3, 2006, provisional application No. 60/788,621, filed on Apr. 3, 2006.

(51) Int. Cl.
*G10L 15/22* (2006.01)

(52) U.S. Cl. .................. 704/251
(58) Field of Classification Search ............ 704/251
See application file for complete search history.

(56) References Cited

U.S. PATENT DOCUMENTS
4,882,757 A 11/1989 Fisher et al.
(Continued)

FOREIGN PATENT DOCUMENTS
EP 0867857 A2 9/1998
(Continued)

OTHER PUBLICATIONS

Smith, Ronnie W., An Evaluation of Strategies for Selective Utterance Verification for Spoken Natural Language Dialog, Proc. Fifth Conference on Applied Natural Language Processing (ANLP), 1997, 41-48.

(Continued)

*Primary Examiner* — Susan McFadden
(74) *Attorney, Agent, or Firm* — Wood, Herron & Evans, LLP

(57) ABSTRACT

A method for assessing a performance of a speech recognition system may include determining a grade, corresponding to either recognition of instances of a word or recognition of instances of various words among a set of words, wherein the grade indicates a level of the performance of the system and the grade is based on a recognition rate and at least one recognition factor. An apparatus for assessing a performance of a speech recognition system may include a processor that determines a grade, corresponding to either recognition of instances of a word or recognition of instances of various words among a set of words, wherein the grade indicates a level of the performance of the system and wherein the grade is based on a recognition rate and at least one recognition factor.

42 Claims, 7 Drawing Sheets